US009425520B2

(12) United States Patent
Kinoshita et al.

(10) Patent No.: US 9,425,520 B2
(45) Date of Patent: Aug. 23, 2016

(54) BATTERY WIRING MODULE

(71) Applicants: AUTONETWORKS TECHNOLOGIES, LTD., Yokkaichi, Mie (JP); SUMITOMO ELECTRIC INDUSTRIES, LTD., Osaka-shi (JP); SUMITOMO WIRING SYSTEMS, LTD., Yokkaichi, Mie (JP)

(72) Inventors: Yuko Kinoshita, Mie (JP); Mitsutoshi Morita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 162 days.

(21) Appl. No.: 14/357,703

(22) PCT Filed: Nov. 1, 2012

(86) PCT No.: PCT/JP2012/078286
§ 371 (c)(1),
(2) Date: May 12, 2014

(87) PCT Pub. No.: WO2013/069525
PCT Pub. Date: May 16, 2013

(65) Prior Publication Data
US 2014/0315441 A1 Oct. 23, 2014

(30) Foreign Application Priority Data

Nov. 11, 2011 (JP) ................................. 2011-247676

(51) Int. Cl.
H01R 33/00 (2006.01)
H01R 11/28 (2006.01)
(Continued)

(52) U.S. Cl.
CPC ........... *H01R 11/288* (2013.01); *H01M 2/1077* (2013.01); *H01M 2/206* (2013.01); *H01M 10/48* (2013.01); *H01M 2220/20* (2013.01); *Y10T 29/49117* (2015.01)

(58) Field of Classification Search
CPC ................................. H01R 11/12; H01R 13/60
USPC .................................................. 439/627, 382
See application file for complete search history.

(56) References Cited

U.S. PATENT DOCUMENTS

| 6,320,756 B1 * | 11/2001 | Ikeda | H05K 1/142 361/760 |
| 8,388,382 B2 * | 3/2013 | Ikeda | H01M 2/1077 439/397 |
| 9,039,454 B2 * | 5/2015 | Ogasawara | H01R 9/226 439/500 |

(Continued)

FOREIGN PATENT DOCUMENTS

| JP | A-2011-008955 | 1/2011 |
| JP | A-2011-008957 | 1/2011 |

(Continued)

OTHER PUBLICATIONS

Dec. 25, 2012 International Search Report issued in PCT Application No. PCT/JP2012/078286 (with translation).

*Primary Examiner* — Abdullah Riyami
*Assistant Examiner* — Nader Alhawamdeh
(74) *Attorney, Agent, or Firm* — Oliff PLC

(57) ABSTRACT

A battery wiring module may include a connecting member and a resin protector. The connecting member may be connected to an electrode terminal, and the connecting member may include a beveled corner. The resin protector may be made of insulating resin and include a holding portion and a coming-off preventing projection. The holding portion may hold the connecting member and may be provided with a surrounding wall that surrounds a peripheral edge of the connecting member. The coming-off preventing projection may include an elastic piece disposed cover the beveled corner of the connecting member and thereby limit movement of the connecting member.

20 Claims, 15 Drawing Sheets

(51) Int. Cl.
   *H01M 2/10*   (2006.01)
   *H01M 2/20*   (2006.01)
   *H01M 10/48*  (2006.01)

(56) References Cited

U.S. PATENT DOCUMENTS

| | | | | |
|---|---|---|---|---|
| 2010/0288532 | A1* | 11/2010 | Ikeda | H01R 31/085 174/133 B |
| 2014/0113494 | A1* | 4/2014 | Kinoshita | H01M 2/1061 439/627 |
| 2014/0256178 | A1* | 9/2014 | Kinoshita | H01R 13/60 439/529 |
| 2014/0295225 | A1* | 10/2014 | Okamoto | H01M 2/206 429/65 |

FOREIGN PATENT DOCUMENTS

| | | | | |
|---|---|---|---|---|
| JP | A-2011-049047 | | 3/2011 | |
| JP | A-2011-067012 | | 3/2011 | |
| JP | A-2011-077031 | | 4/2011 | |
| JP | A-2011-091003 | | 5/2011 | |
| JP | A-2011-210710 | | 10/2011 | |
| WO | WO 2011021614 | * | 2/2011 | H01M 2/1077 |
| WO | WO 2011021614 A1 | * | 2/2011 | H01M 2/1077 |
| WO | WO 2011/052699 A1 | | 5/2011 | |
| WO | WO 2011142213 | * | 11/2011 | H01M 2/20 |

* cited by examiner

BATTERY WIRING MODULE

TECHNICAL FIELD

The present invention relates to battery wiring modules.

BACKGROUND ART

In battery modules for electric cars and hybrid cars, a plurality of single cells having positive and negative electrode terminals are lined up in a row. In such a battery module, a plurality of single cells are electrically connected by connecting a positive electrode terminal (positive terminal) and a negative electrode terminal (negative terminal) with a connecting member such as a bus bar.

A battery wiring module as described in Patent Document 1, for example, is used to electrically connect a plurality of single cells.

CITATION LIST

Patent Documents

Patent Document 1: JP 2011-8955A

SUMMARY OF THE INVENTION

Technical Problem

The battery wiring module described in Patent Document 1 above includes a plurality of resin-made holding units having a holding portion for holding a bus bar. The bus bar is inserted into the holding portion in the holding unit from above and is housed therein. The holding units housing the bus bar are disposed on a terminal forming surface on which the electrode terminals of the single cells are formed and the bus bars and the electrode terminals are connected to each other.

In this battery wiring module, a locking projection for preventing the bus bar that is inserted from above from coming off is provided in the holding portion in the holding unit (see FIG. 3 in Patent Document 1). This locking projection is formed at the end portion of an elastic piece formed between two slits formed in a vertical direction of the holding portion. That is, since the holding portion is provided with the slits, the connecting member such as a bus bar is held in a state of being exposed at the slit portion. Therefore, there is concern that short circuits occur due to contact between the exposed connecting member and the members that are made of a conductive material and are disposed around the battery.

The present invention was made based on the forgoing circumstances, and it is an object thereof to provide a battery wiring module in which short circuits due to contact between the connecting member and members that are disposed around a single cell are prevented.

Solution to Problem

To solve the foregoing problems, the present invention is a battery wiring module to be attached to a single cell group obtained by lining up a plurality of single cells having a positive electrode terminal and a negative electrode terminal, and the battery wiring module includes a plurality of connecting members to be connected to the electrode terminals, and a resin protector that is made of insulating resin and includes holding portions for holding the connecting members, wherein the connecting members have a beveled corner, the holding portions are provided with a surrounding wall that surrounds a peripheral edge of the corresponding connecting member, and a coming-off preventing projection provided with an elastic piece capable of being bent and deformed that is disposed so as to cover the beveled corner of the corresponding connecting member and prevents the connecting member from coming off projects from an inner wall of the surrounding wall.

In the present invention, the coming-off preventing projection provided with the elastic piece that is disposed so as to cover the beveled corner of the connecting member is formed on the inner wall of the surrounding wall of the holding portion in the resin protector. That is, in the present invention, the elastic piece is provided on the coming-off preventing projection projecting from the inner wall of the surrounding wall, and therefore, a structure for preventing the connecting member from coming off can be provided without forming a cut-out portion such as a slit in the outer wall of the surrounding wall. As a result, with the present invention, the connecting member is not exposed from the holding portion in the resin protector, and therefore, it is possible to provide the battery wiring module in which short circuits due to contact between the connecting member and members that are disposed around the single cell are prevented.

Moreover, in the present invention, since the coming-off preventing projection is formed corresponding to the beveled corner of the connecting member, a corner of the connecting member is formed in a beveled shape and the portion corresponding to the beveled corner of the connecting member in the inner wall of the holding portion may have a projecting shape. Therefore, with the present invention, no special machining is needed on the connecting member and space can be saved.

The present invention may have a configuration below.

A coming-off preventing portion disposed so as to cover a portion other than the corner of the connecting member may be provided on the surrounding wall of the holding portion, and an insulating holding portion that maintains an insulating state of the connecting member may be formed outside the surrounding wall of the holding portion, corresponding to the coming-off preventing portion.

When such a configuration is adopted, even if a slit or a cut-out portion is formed in the surrounding wall in the holding portion in order to provide the coming-off preventing portion for preventing the connecting member from coming off in the holding portion, the insulating state of the connecting member is maintained, and therefore, short circuits due to contact between the connecting member and members that are disposed around the single cell are prevented while preventing the connecting member from coming off. Furthermore, when the above-described configuration is adopted, a plurality of structures for preventing the connecting member from coming off are provided in the holding portion, and the connecting member can be reliably prevented from coming off.

A voltage detecting terminal can be housed in the holding portion together with the connecting member, and a terminal locking portion that prevents the connecting member from coming off by locking the voltage detecting member may be provided at the inner wall of the surrounding wall so as to project or be recessed therefrom.

When such a configuration is adopted, by locking the voltage detecting terminal to the terminal locking portion formed on the surrounding wall, the connecting member is prevented from coming off the holding portion, and therefore, it is possible to cause one member to have two functions. Furthermore, since the terminal locking portion is provided on the inner wall of the surrounding wall so as to project therefrom or have a recess therein, the connecting member and the voltage detecting terminal are not exposed from the surrounding wall, and therefore, insulating properties are maintained and short circuits due to contact between the connecting member and members that are disposed around the single cell are also prevented.

Advantageous Effects of the Invention

With the present invention, it is possible to provide a battery wiring module in which short circuits due to contact between the connecting member and members that are disposed around a battery are prevented.

DESCRIPTION OF EMBODIMENTS

Embodiment 1

Figure 1:
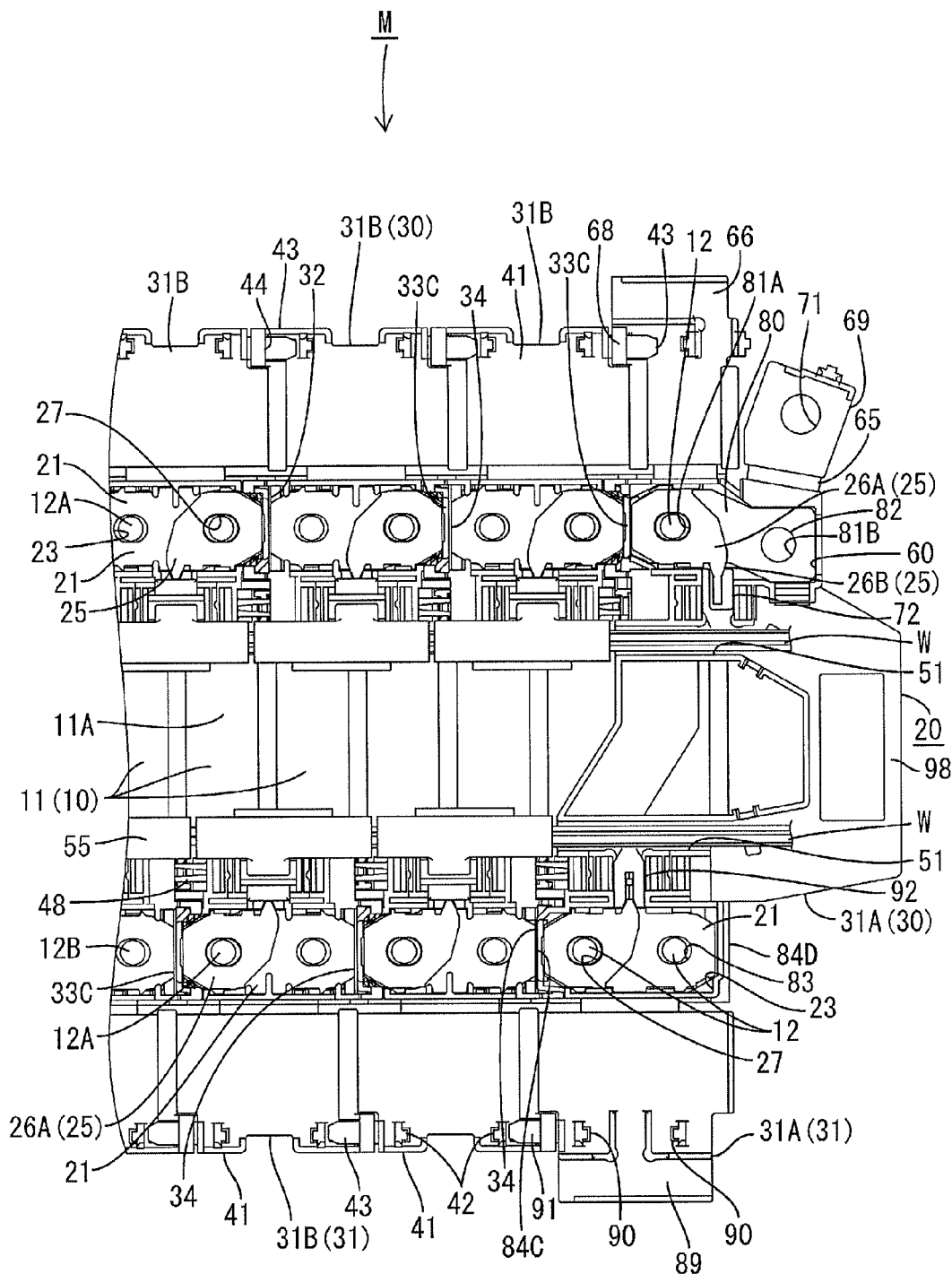
FIG. 1 is a plan view of a battery module of Embodiment 1.

Embodiment 1 of the present invention will be described with reference to FIGS. 1 to 15. A battery wiring module 20 according to this embodiment is attached to a single cell group 10 obtained by lining up a plurality of single cells 11 having a positive and a negative electrode terminals 12. It should be noted that a portion (corresponding to seven single cells) of the single cell group 10 is shown in FIG. 1. Hereinafter, the positive electrode terminal 12 is referred to as "positive terminal 12A", the negative electrode terminal 12 is referred to as "negative terminal 12B", and both terminals are collectively referred to as "electrode terminals 12".

A battery module M obtained by attaching the battery wiring module 20 of this embodiment to the single cell group 10 is used as a driving source of a vehicle (not shown) such as an electric car and a hybrid car. The plurality of single cells 11 constituting the single cell group 10 are connected in series by electrically connecting the positive terminal 12A of one single cell 11 and the negative terminal 12B of another single cell 11 with the battery wiring module 20. In the description below, the upper sides in FIGS. 4, 7, 10 and 11 are taken as upper sides, and the lower sides therein are taken as lower sides.

Single Cell 11

The single cell 11 has a flat rectangular parallelepiped shape. As shown in FIG. 1, the positive terminal 12A and the negative terminal 12B are formed on an upper surface 11A of the single cell 11. The electrode terminals 12 include a platform (not shown) made of a metal plate and an electrode post 13B with a round bar shape projecting upward from the platform. A screw thread (not shown) is formed on the surface of the electrode post 13B.

The plurality of single cells 11 are lined up in a row such that the polarities of the neighboring electrode terminals 12 of the single cells 11 are different (that is, such that the positive terminals 12A and the negative terminals 12B are alternately disposed). The electrode post 13B is inserted into a through hole 23 of a bus bar 21 (an example of the connecting member) and is fixed to the bus bar 21 by being screwed with a screw member (not shown). Moreover, the plurality of single cells 11 are fixed with holders (not shown) so as to constitute the single cell group 10.

Battery Wiring Module 20

The battery wiring module 20 is attached to the row of electrode terminals 12 that are arranged in two rows in a horizontal direction shown in FIG. 1 in the single cell group 10. The battery wiring module 20 includes a plurality of bus bars 21 having a pair of through holes 23 into which the respective electrode posts 13B of the positive terminal 12A and the negative terminal 12B in the single cell 11 are inserted to be connected thereto, a plurality of voltage detecting terminals 25 that are connected to the bus bars 21 and detect voltage of the single cells 11, and a resin protector 30 that is made of insulating resin and has holding portions 32, 60 and 83 for holding the bus bars 21.

Resin Protector 30

The resin protector 30 is obtained by lining up and coupling holding units 31 having the holding portions 32, 60 and 83 in a direction in which the single cells 11 are lined up as shown in FIG. 1. The coupling structure of the holding units 31 will be specifically described below.

In this embodiment, as shown in FIG. 1, the holding unit 31 includes a first holding unit 31A disposed at the end portion thereof and second holding units 31B other than the first holding unit 31A. The holding unit 31 disposed at the right end portion in FIG. 1 is a first holding unit 31A, and the other holding units 31 shown in FIG. 1 are second holding units 31B. Hereinafter, the second holding unit 31B and the first holding unit 31A will be described in this order.

Second Holding Unit 31B

Figure 2:
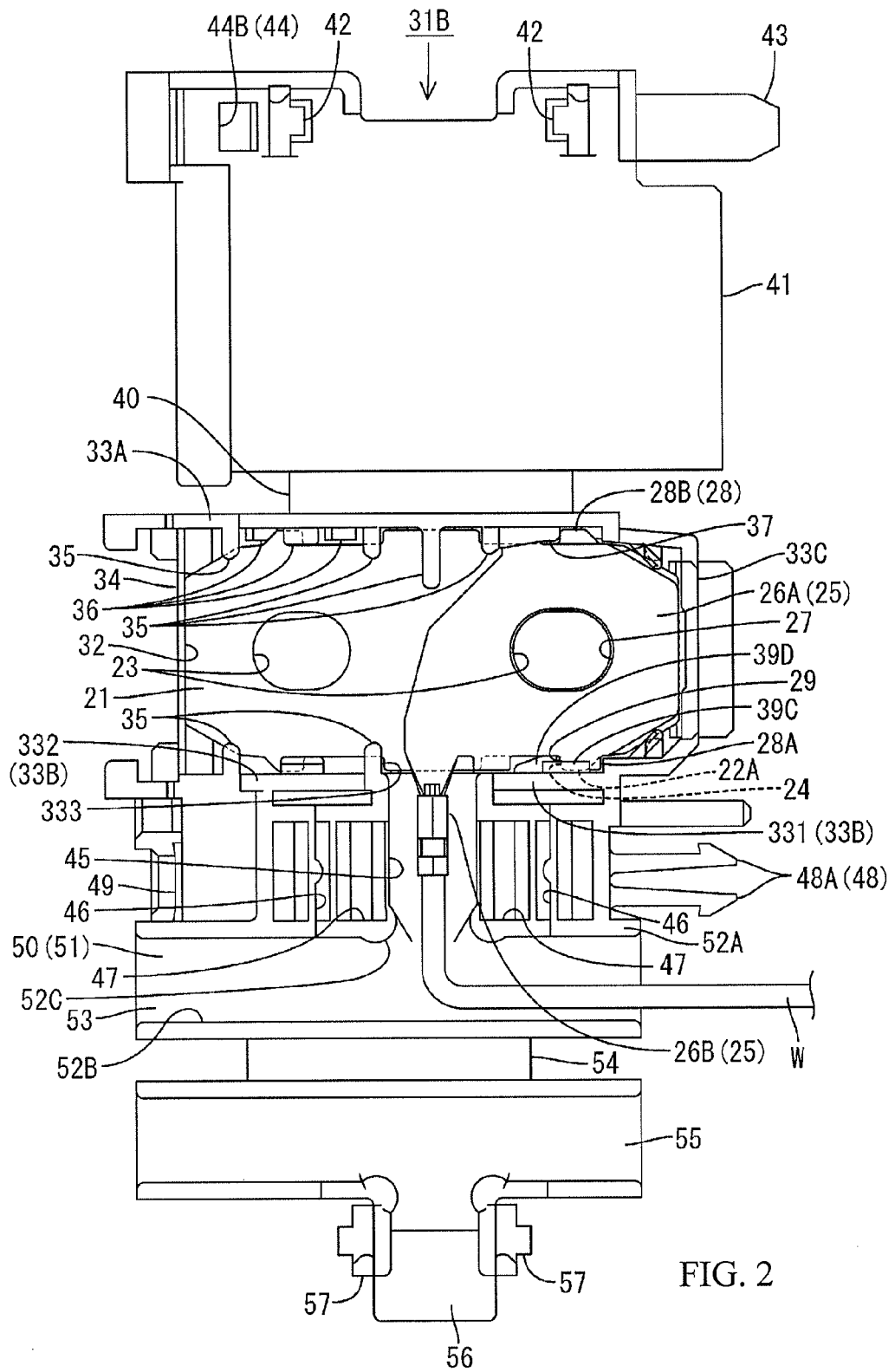
FIG. 2 is a perspective view of a second holding unit.
Figure 3:
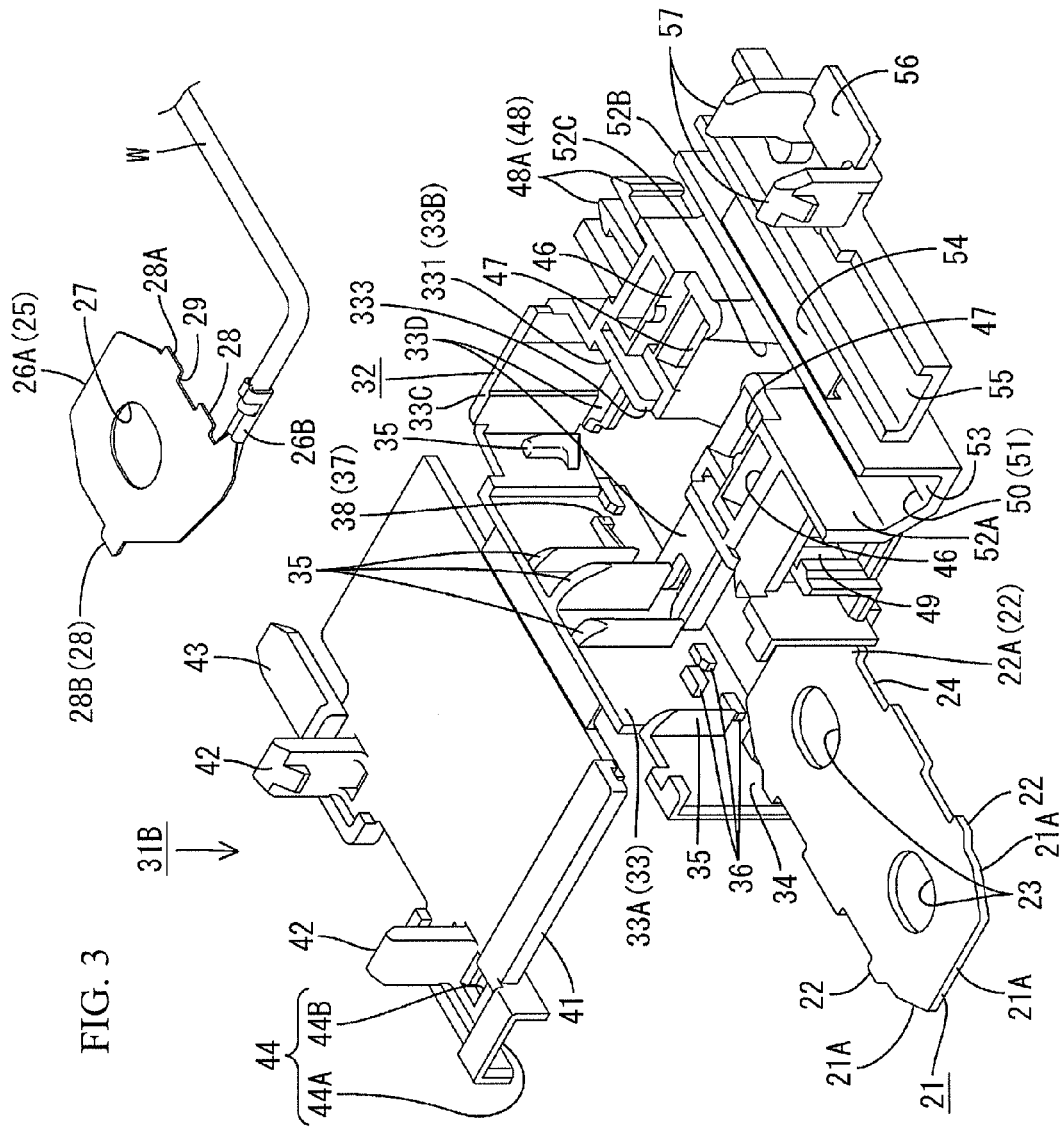
FIG. 3 is a plan view of the second holding unit.

As shown in FIGS. 2 and 3, the second holding unit 31B includes a holding portion 32 that houses and holds the bus bar 21 and the voltage detecting terminal 25, a guiding-out groove 45 that guides out a detecting wire W connected to the voltage detecting terminal 25, a wire housing portion 50 that houses the detecting wire W in the voltage detecting terminal 25, which is guided out from the guiding-out groove 45, a first lid 41 that covers the holding portion 32, and a second lid 55 that covers the wire housing portion 50. These members are formed integrally. Hereinafter, the respective members in the second holding unit 31B will be described.

Holding Portion 32 in Second Holding Unit 31B

As shown in FIG. 3, the holding portion 32 in the second holding unit 31B opens upward and includes a wall 33 (33A, 33B and 33C) that holds three sides other than the left side in FIG. 2 of the bus bar 21 such that the bus bar 21 can be housed therein, and a bottom wall 33D on which the bus bar 21 is placed.

As shown in FIG. 2, the bottom walls 33D are partially provided in substantially the central portion of the holding portion 32, at the left end portion shown in the drawing, and at the right end portion shown in the drawing such that they do not prevent the bus bar 21 and the electrode terminals 12 from being electrically connected to each other while a portion of the bus bar 21 is placed thereon.

Although not being specifically illustrated, the height of the wall 33 is set such that the wall 33 is higher than the upper end portion of the electrode terminals 12 in a state where the battery wiring module 20 is connected to the single cell group 10. Thereby, it is possible to suppress short circuits between the positive terminal 12A and the negative terminal 12B via a tool or the like due to contact of the tool or the like with the positive terminal 12A and the negative terminal 12B.

The wall 33 includes a back wall 33A that is disposed along the side edge on the back side in FIG. 2 of a pair of side edges of the bus bar 21 in a longitudinal direction, a front wall 33B that is disposed along the side edge on the front side in FIG. 2 of a pair of side edges of the bus bar 21 in a longitudinal direction, and a right side wall 33C that is disposed along the side edge on the right side in FIG. 2 of a pair of side edges of the bus bar 21 in a short-length direction. In substantially the central portion of the front wall 33B in a longitudinal direction, an opening 333 that divides the front wall 33B into two portions is provided so as to be in communication with the guiding-out groove 45. The portion of the front wall 33B, which is divided into two portions by the opening 333, on the right side in FIG. 2 is referred to as "right front wall 331", and the portion of the front wall 33B on the left side in FIG. 2 is referred to as "left front wall 332".

Incidentally, in this embodiment, a portion of the holding portion 32 where the side edge (left side edge 21A) on the left side in FIG. 2, of the pair of side edges of the bus bar 21 in a short-length direction, is disposed is an open end 34 (see FIG. 3), where the wall portion 33 is not formed. The bus bar 21 can be inserted from the open end 34 in a direction in which the single cells 11 are lined up (that is, in a horizontal direction in FIG. 2), and the open end 34 serves as a bus bar inserting portion 34.

The right side wall 33C of the holding portion 32 serves as an insulating wall 33C that maintains a state of insulation from the bus bar 21 held by the neighboring second holding unit 31B.

As shown in FIGS. 2 and 3, a plurality of coming-off preventing portions 35 that prevent the inserted bus bar 21 from coming off by limiting its vertical movement project inward from the respective inner walls of the front wall 33B and the back wall 33A.

As shown in FIG. 2, guiding portions 36 that guide the bus bar 21 inserted from the open end 34 in the holding portion 32 into the holding portion 32 to the front side (side of the right side wall 33C) in a direction of the insertion of the bus bar 21 project in a region on the side of the open end 34 (left side in FIG. 2) from the center of the back wall 33A.

A terminal locking piece 37 that limits the upward movement and the frontward movement (in the right direction shown in the drawing) in a direction of the insertion of the bus bar 21 of the voltage detecting terminal 25 projects in a region on the side of the right side wall 33C (right side in FIG. 2) from the center of the back wall 33A. The terminal locking piece 37 projects in the direction of the insertion of the bus bar 21, and the bus bar 21 and the voltage detecting terminal 25 can be disposed thereunder. A locking projection 38 is provided at the front end of the terminal locking piece 37 in the direction of the insertion of the bus bar 21 and a second projecting piece 28B (details will be described below) of the voltage detecting terminal 25 is locked to the locking projection 38.

Figure 6:
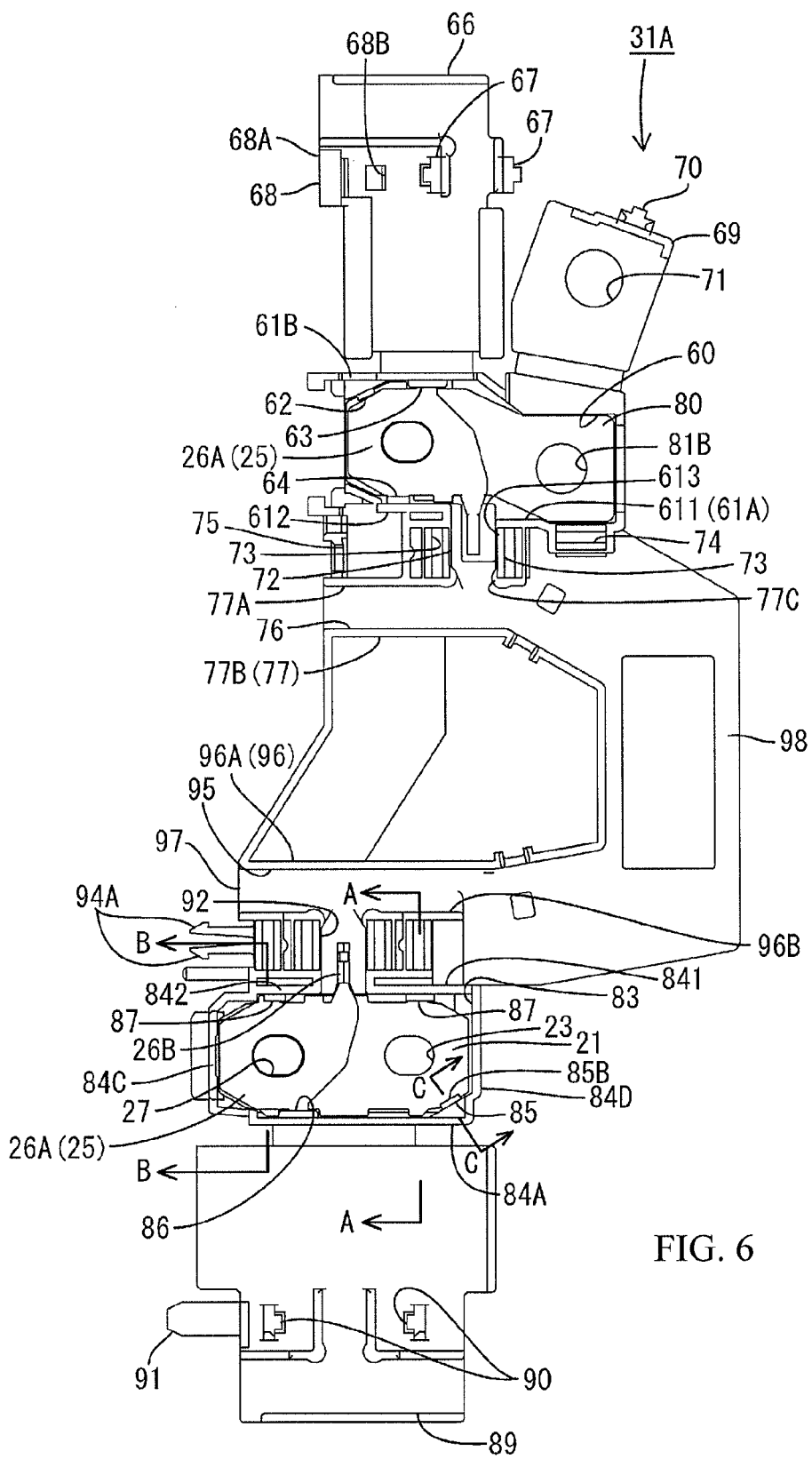
FIG. 6 is a plan view of the first holding unit.

Moreover, in this embodiment, as shown in FIG. 6, no portion, such as a slit, from which the bus bar 21 is exposed to the exterior of the holding portion 32 is formed in the back wall 33A of the holding portion 32. Therefore, the back wall 33A disposed in the direction in which the single cells are lined up can hold the bus bar 21 in a state where the bus bar 21 is not exposed from the holding portion 32, and it is possible to prevent short circuits due to contact of the bus bar 21 with tools, surrounding metal members or the like.

Figure 4:
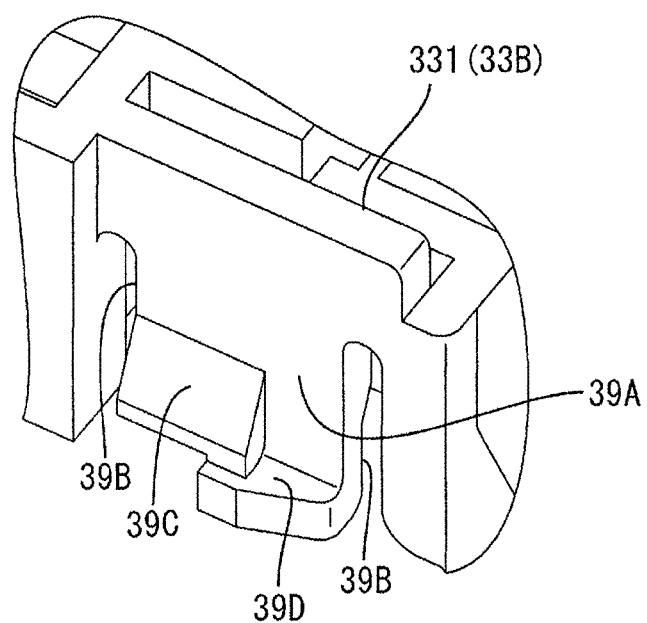
FIG. 4 is an enlarged perspective view illustrating the main part of a locking portion in the second holding unit.

As shown in FIG. 4, two slits 39B extend upward from the lower end of the right front wall 331 in the holding portion 32, and an elastic engaging piece 39A is formed therebetween. This elastic engaging piece 39A is provided with a terminal locking claw 39C to which the voltage detecting terminal 25 is locked, and a bus bar locking claw 39D to which the bus bar 21 is locked, arranged one above the other in the vertical direction. Although the bus bar locking claw 39D is provided on the backward side (right side in FIG. 4) of the terminal locking claw 39C in the direction of the insertion of the bus bar 21, the terminal locking claw 39C and the bus bar locking claw 39D are provided so as to partially overlap each other.

Although a first projecting piece 28A (details will be described below) in the voltage detecting terminal 25 inserted from above abuts against the terminal locking claw 39C and elastically deforms it toward the exterior of the wall 33, the terminal locking claw 39C elastically returns to the former state when the voltage detecting terminal 25 is disposed under the terminal locking claw 39C, and thereby, the upward movement of the voltage detecting terminal 25 is limited.

When a projecting portion 22A in the bus bar 21 inserted from the open end 34 passes through, the bus bar locking claw 39D is elastically deformed toward the exterior of the wall 33. However, if the bus bar 21 is provided with a recess 24, the bus bar locking claw 39D is received in this recess 24 and elastically returns to the former state, and thereby, the bus bar 21 is locked to the bus bar locking claw 39D. In this embodiment, a recess 29 in the voltage detecting terminal 25 disposed right above the recess 24 in the bus bar 21 is also locked to the bus bar locking claw 39D.

First Lid 41

As shown in FIGS. 1, 2 and 3, the first lid 41 is integrally provided in the holding portion 32 via a hinge 40 extending from the upper end of the back wall 33A. The first lid 41 can rotate about the hinge 40 as an axial center. When the first lid 41 is closed, the entire holding portion 32 and a portion of the guiding-out groove 45 are covered therewith.

As shown in FIGS. 2 and 3, a pair of first locking pieces 42 projects from the surface of the first lid 41, which is disposed on the lower side when the lid is closed. The first locking pieces 42 are locked to first locking grooves 46 formed at the positions adjacent to second locking grooves 47 (described below) that are provided on both sides of the guiding-out groove 45 in the width direction. Although details will be described below, a lid coupling engaging piece 43 and a lid coupling engaged portion 44 that are used to couple the first lids 41 of the neighboring holding units 31 are provided at the positions adjacent to the pair of first locking pieces 42.

Guiding-Out Groove 45

The guiding-out groove 45 is a groove-shaped member in which a barrel portion 26B of the voltage detecting terminal 25 guided out from the holding portion 32 and the detecting wire W crimped to the barrel portion 26B are disposed and by which the holding portion 32 and the wire housing portion 50 are in communication with each other. The guiding-out groove 45 has a recessed shape, and is provided in a direction that is substantially perpendicular to the direction in which the single cells 11 are lined up. Specifically, the guiding-out groove 45 is provided so as to pass through the opening 333 of the front wall 33B of the holding portion 32 to be in communication with the holding portion 32 and to pass through an opening 52C of a back side groove wall 52A (details will be described below) in the wire housing portion 50 to be in communication with the wire housing portion 50.

Wire Housing Portion 50

The wire housing portion 50 is constituted of a pair of groove walls 52 extending in the direction in which the single cells 11 are lined up and a bottom wall 53 connecting the pair of groove walls 52 so as to have a cross-section with a recessed shape. By coupling the holding units 31 to each other, the wire housing portions 50 are coupled, and one groove (wire housing groove 51) that is continuous in the direction in which the single cells 11 are lined up is formed.

The detecting wires W that are guided out from the respective guiding-out grooves 45 in the holding units 31 are bent at substantially a right angle and are housed in the direction of the extension of the wire housing portion 50. A plurality of detecting wires W housed in the wire housing portion 50 are guided out to the side of a monitoring ECU (not shown).

Here, the monitoring ECU is an ECU in which a microcomputer, elements and the like are installed, and the ECU has a well-known configuration with a function of monitoring and controlling the respective single cells 11 by detecting a voltage, current, temperature and the like in the single cell 11.

The groove wall 52 on the side of the guiding-out groove 45 is referred to as "back side groove wall 52A", and the other groove wall 52 is referred to as "front side groove wall 52B". The back side groove wall 52A is provided corresponding to the front wall 33B of the holding portion 32. Even if the bus bar 21 and the voltage detecting terminal 25 are exposed from the slits 39B formed on both sides of the elastic piece 39A and a slit-shaped cut-out portion between the lower end of the elastic piece 39A and the bottom wall 33D, they do not come in contact with conductive members disposed around them.

The back side groove wall 52A is provided with the opening 52C that divides the back side groove wall into two portions, and the guiding-out groove 45 passes through the opening 52C. The second lid 55 that covers the wire housing portion 50 is connected to the front side groove wall 52B via a hinge 54.

Second Lid 55

As shown in FIGS. 2 and 3, the wire housing portion 50 is integrally provided with a second lid 55 via the hinge 54 extending from the side surface of the front side groove wall 52B. The second lid 55 can rotate about the hinge 54 as an axial center. When the second lid 55 is closed, the entire wire housing portion 50 is covered therewith (see FIG. 1). An extending lid 56 that covers the guiding-out groove 45 from above when the lid is closed and is provided with a pair of second locking pieces 57 to which the second lid 55 is locked extends from the side edge of the second lid 55. The second locking pieces 57 project from both side edges of the extending lid 56 in a width direction. The second locking pieces 57 are locked to second locking grooves 47 provided on both sides of the guiding-out groove 45 in a width direction.

In this embodiment, when the first lid 41 is closed after the second lid 55 is closed, the extending lid 56 in the second lid 55 and the first lid 41 partially overlap each other, and therefore, the guiding-out groove 45 is covered with two lids, that is, the extending lid 56 in the second lid 55 and the first lid 41. Thereby, it is possible to maintain a state where the entire region above the holding unit 31 is covered with the lids 41 and 55.

Coupling Structure of Second Holding Units 31B

Next, the coupling structure for coupling the neighboring holding units 31 to each other will be described. As shown in FIGS. 2 and 3, coupling engaging claws 48 that couple the neighboring holding units 31 to each other and a coupling engaging recess 49 that can engage the coupling engaging claws 48 are provided at the positions adjacent to the pair of first locking grooves 46 in the second holding unit 31B. The coupling engaging claws 48 are provided on the right side of the first locking groove 46 on the right side shown in the drawing, and the coupling engaging recess 49 is provided on the left side of the first locking groove 46 on the left side shown in the drawing.

When a pair of elastic pieces 48A, on which the coupling engaging claws 48 are formed, of one of the neighboring holding units 31 is inserted into the coupling engaging recess 49 of another holding unit 31, the pair of elastic pieces 48A is inserted thereinto while being elastically deformed in a direction in which the pair of elastic pieces 48A comes closer to each other. When being inserted to a predetermined position, the pair of elastic pieces 48A elastically returns to the former state and is engaged with the coupling engaging recess 49.

Moreover, as shown in FIGS. 2 and 3, the lid coupling portions 43 and 44 that couple the first lids 41 in neighboring holding units 31 to each other are provided on both sides of the pair of first locking pieces 42 of the first lid 41 in the second holding unit 31B. The lid coupling engaging piece 43 is formed at the right end portion of the first lid 41 in FIG. 4, and the lid coupling engaged portion 44 is formed at the left end portion of the first lid 41 in FIG. 4.

A coupling engaging projection 43A that is engaged with coupling engaging hole 44B or 68B in the mating lid coupling engaged portion 44 or 68 is formed at the end portion of the lid coupling engaging piece 43. The lid coupling engaged portion 44 includes an engaging piece inserting portion 44A that is open in the direction in which the holding units 31 are coupled to each other such that the lid coupling engaging piece 43 or 91 can be inserted thereinto and the coupling engaging hole 44B that is provided adjacently to the engaging piece inserting portion 44A and that can receive and engage the coupling engaging projection 43A in the lid coupling engaging piece 43 or 91. The lid coupling engaging piece 43 is inserted into the engaging piece inserting portion 44A in the lid coupling engaged portion 44 and the coupling engaging hole 44B engages the coupling engaging projection 43A, so that it is possible to couple the neighboring first lids 41 to each other.

Bus Bar 21

The bus bar 21 that is held by the holding portion 32 in the second holding unit 31B is obtained by pressing a plate material made of metal such as copper, copper alloy, stainless steel, and aluminum into a predetermined shape. The surface of the bus bar 21 may be plated with metal such as tin and nickel. The dimension in the longitudinal direction (horizontal direction in FIGS. 3 and 4) of the bus bar 21 is set depending on the dimension between the electrode terminals 12A and 12B in the neighboring single cells 11.

As shown in FIG. 2, the pair of through holes 23 is formed with a predetermined gap therebetween in the bus bar 21. The respective electrode posts 13B of the electrode terminals 12 in the single cell 11 are inserted into the pair of through holes 23. The through hole 23 of this embodiment has an oval shape taking the direction in which the single cells 11 are lined up (horizontal direction in FIG. 1) as the longitudinal direction.

In this embodiment, the oval through hole 23 can absorb displacement of pitch between the neighboring electrode terminals 12A and 12B due to a manufacturing tolerance or an assembling tolerance of the single cell 11.

Moreover, as shown in FIG. 3, the bus bar 21 has a shape obtained by beveling four corners 21A of a rectangular plate, that is, a shape with four beveled corners 21A, and can be smoothly inserted into the holding portion 32 in the holding unit 31.

As shown in FIG. 2, projecting portions 22 that project in the width direction (direction of a short side) of the bus bar 21 and have a trapezoidal shape as viewed from above are formed at the end portions of a pair of end surfaces of the bus bar 21 in the longitudinal direction. The recesses 24 are formed adjacently to the trapezoidal projecting portions 22 on a pair of end surfaces of the bus bar 21 in the longitudinal direction.

Of the two projecting portions 22 formed in the bus bar 21 on the front side in FIG. 2, the projecting portion 22A on the right side is locked to the bus bar locking claw 39D in the holding portion 32 received by the neighboring recess 24.

Voltage Detecting Terminal 25

As shown in FIG. 3, the voltage detecting terminal 25 that is superposed on the bus bar 21 in the holding portion 32 in the second holding unit 31B includes a body portion 26A with a plate shape and the barrel portion 26B that extends from the body portion 26A and on which the detecting wire W is crimped. The central portion of the body portion 26A is penetrated to form an inserting hole 27 that is disposed so as to be superposed on one of the pair of through holes 23 in the bus bar 21, and into which the electrode post 13B in the electrode terminal 12 inserted into one of the through holes 23 in the bus bar 21 can be inserted. The inserting hole 27 is formed so as to be slightly larger than the through hole 23 in the bus bar 21.

Projecting pieces 28 projecting outward are formed on the edge on which the barrel portion 26B in the voltage detecting terminal 25 is formed and on the edge opposing that edge. Of the two projecting pieces 28 formed on the edge on the side of the barrel portion 26B, the projecting piece 28A (first projecting piece 28A) on the right side in FIG. 2 is locked to the terminal locking claw 39C in the holding portion 32, and thereby, the upward movement of the voltage detecting terminal 25 is limited. The recess 29 is formed by being cut out between the two projecting pieces 28 formed on the edge on the side of the barrel portion 26B. This recess 29 in the voltage detecting terminal 25 is disposed so as to overlap a portion of the corresponding recess 24 in the bus bar 21 and can receive the bus bar locking claw 39D.

The projecting piece 28 (second projecting piece 28B) formed on the edge opposing the edge on the side of the barrel portion 26B is locked to the terminal locking piece 37 in the holding portion 32, and thereby, the vertical movement of the voltage detecting terminal 25 is limited.

The voltage detecting terminal 25 is obtained by pressing a plate material made of metal such as copper, copper alloy, stainless steel, and aluminum into a predetermined shape. The surface of the voltage detecting terminal 25 may be plated with metal such as tin and nickel.

The detecting wire W connected to the voltage detecting terminal 25 is housed in the wire housing portion 50 in the holding unit 31 and is connected to the monitoring ECU provided on the right side in FIG. 1.

First Holding Unit 31A

Figure 5:
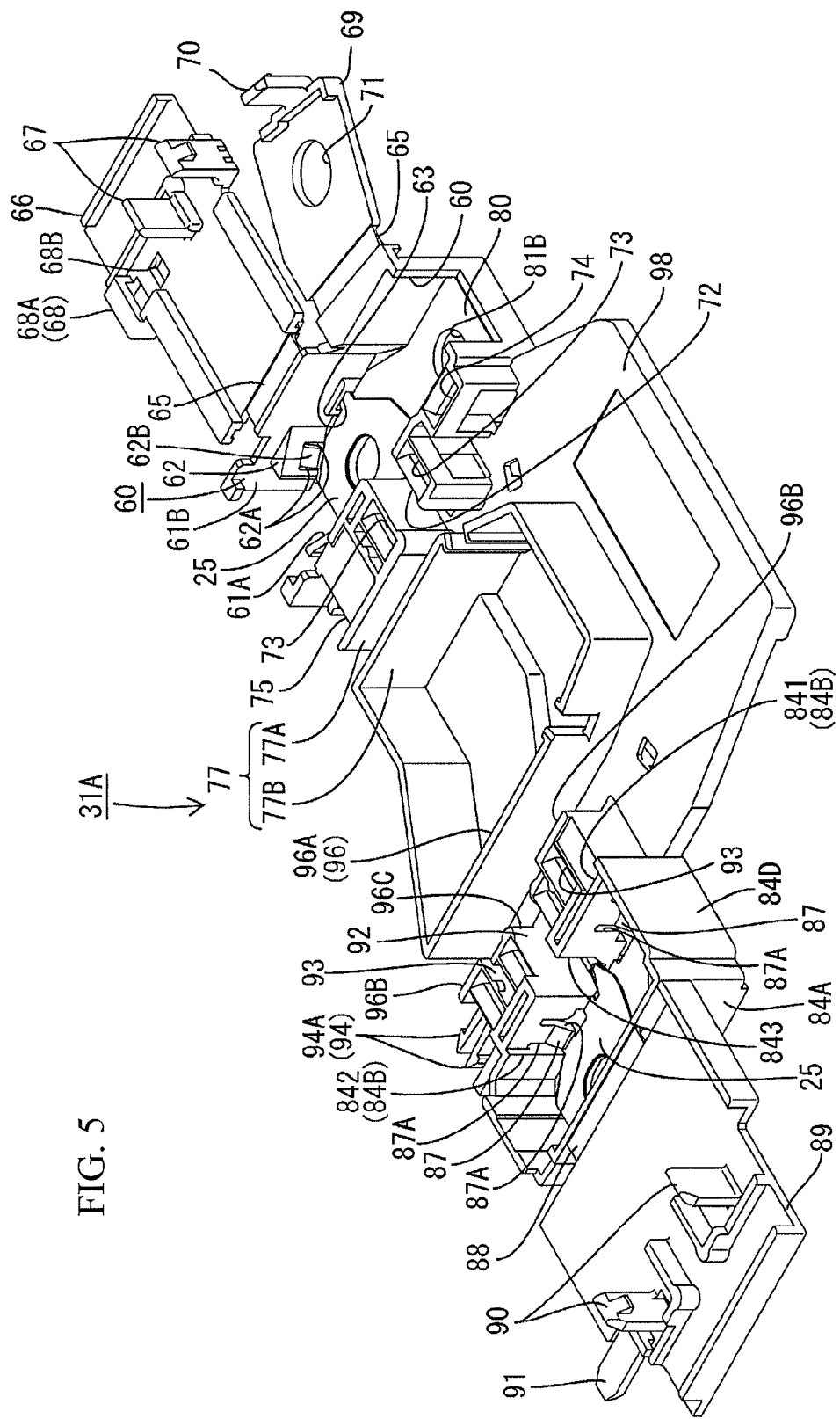
FIG. 5 is a perspective view of a first holding unit.

Next, the first holding unit 31A will be described. As shown in FIGS. 1, 5 and 6, the first holding unit 31A includes two holding portions 60 and 83 that house and hold a bus bar 21 and a voltage detecting terminal 25, two guiding-out grooves 72 and 92 that guide out the detecting wire W connected to the voltage detecting terminal 25, and two wire housing portions 76 and 95 that house the detecting wire W in the voltage detecting terminal 25 guided out from the guiding-out grooves 72 and 92. In the first holding unit 31A, the two wire housing portions 76 and 95 are coupled to each other with a coupling portion 98 formed at substantially the center of the first holding unit 31A, and the two holding portions 60 and 83 are covered with lids 66 and 69, and a lid 89, respectively. These members are integrally formed.

Hereinafter, the respective members in the first holding unit 31A will be described. Of the two holding portions 60 and 83 in the first holding unit 31A, the holding portion 60 shown on the back side in FIG. 1 is referred to as "first holding portion 60", and the holding portion 83 shown on the front side in FIG. 1 is referred to as "second holding portion 83".

First Holding Portion 60 in First Holding Unit 31A

An external connecting bus bar 80 that connects the electrode terminal 12 and an external device (not shown) is housed in the first holding portion 60. By disposing a right side wall 84D of the holding portion 32 in the neighboring second holding unit 31B on the left side of this first holding portion 60, the bus bar 21 held by that second holding unit 31B and the external connecting bus bar 80 in the first holding portion 60 are maintained in a state in which they are not in contact with each other.

As shown in FIG. 5, the first holding portion 60 is open upward and includes a wall (front wall 61A) on the front side in FIG. 6 and a wall (back wall 61B) on the back side in FIG. 6 that are formed so as to be capable of holding the external connecting bus bar 80, and a bottom wall 61C on which the external connecting bus bar 80 is placed.

Figure 8:
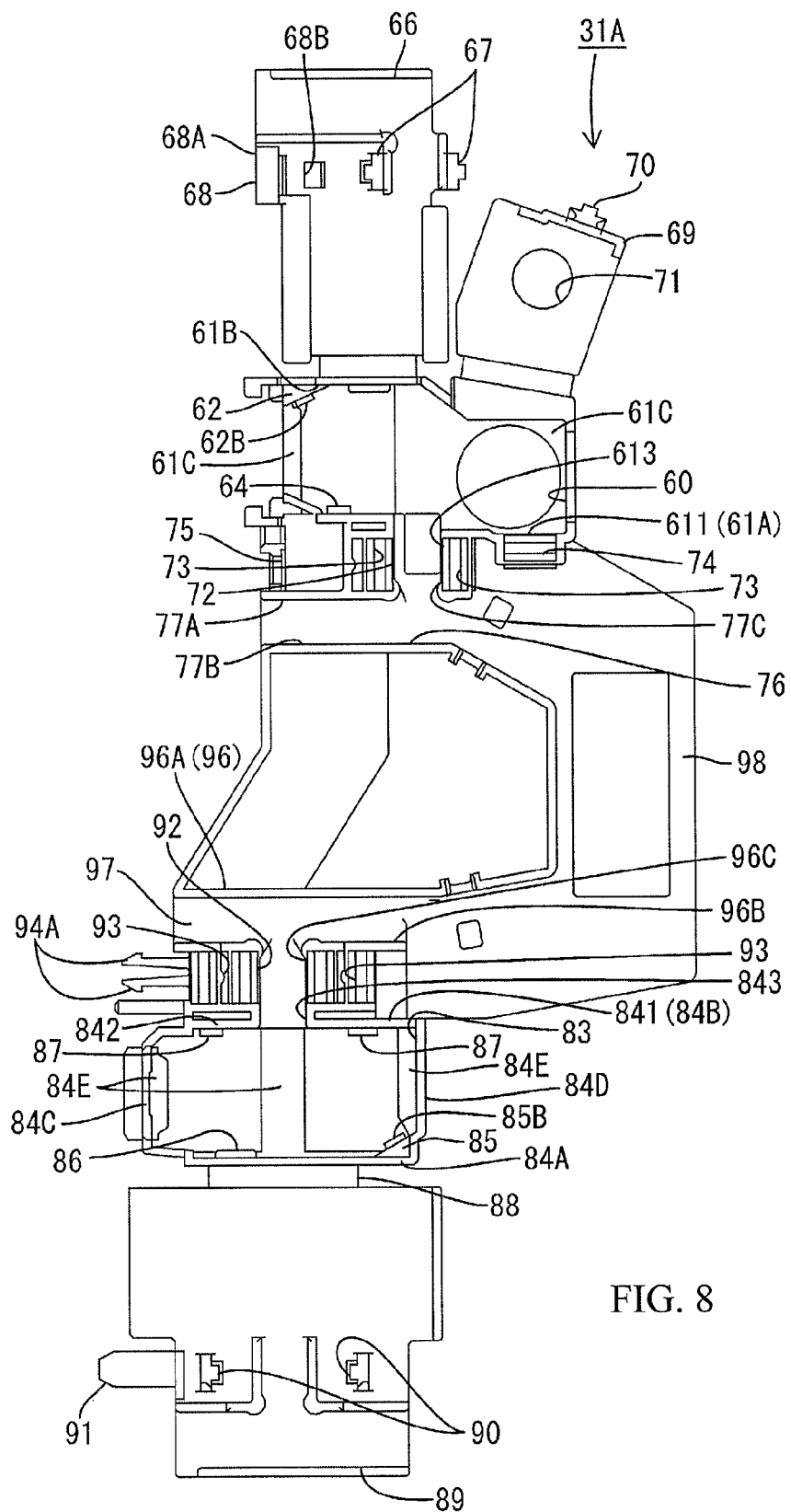
FIG. 8 is a plan view of the first holding unit before a connecting member is inserted thereinto.
Figure 9:
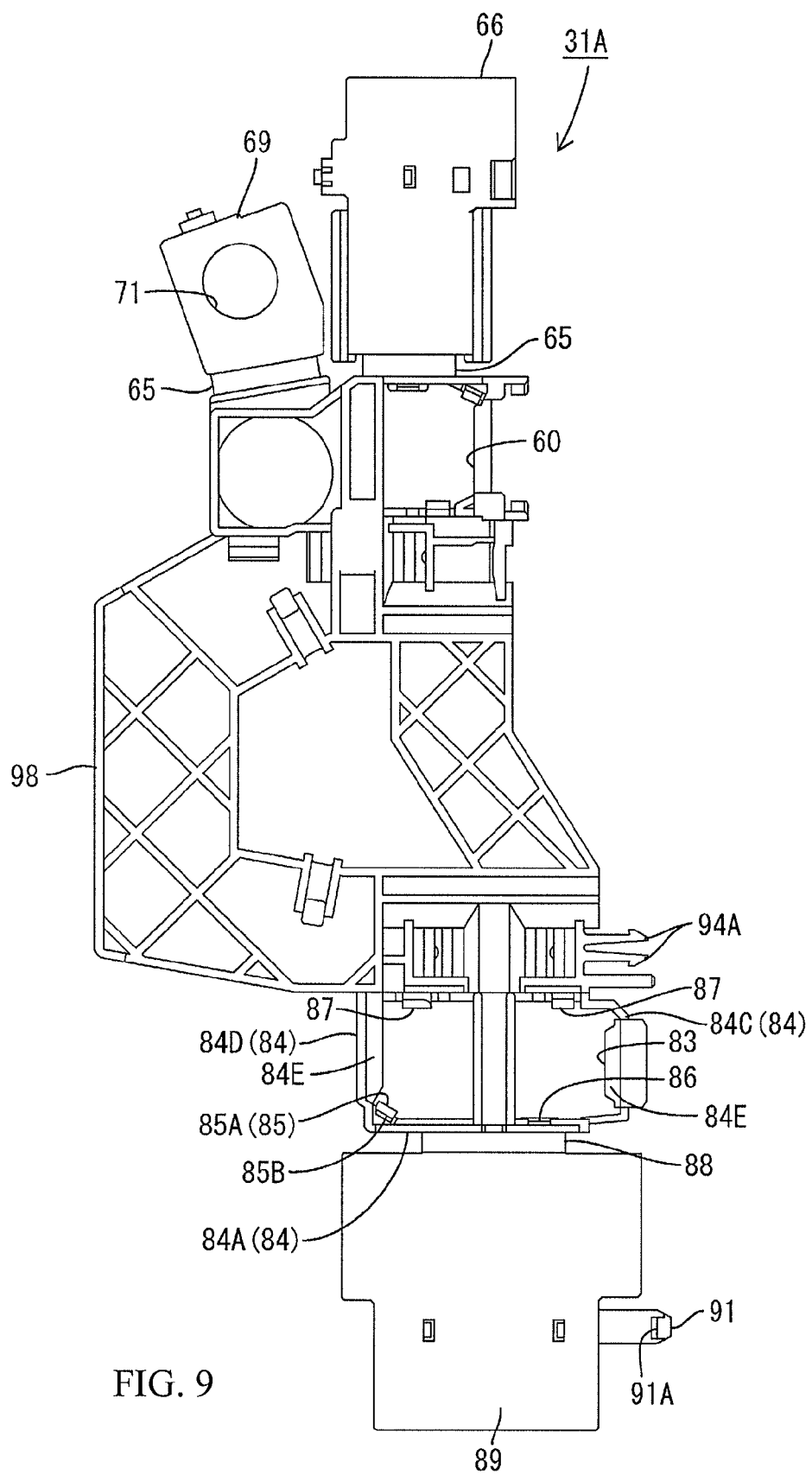
FIG. 9 is a rear view of the first holding unit before a connecting member is inserted thereinto.

As shown in FIG. 8, the bottom walls 61C are partially provided at the right portion of the first holding portion 60 and at the left end portion shown in the drawing. The heights of the front wall 61A and the back wall 61B are set so as to be higher than the upper end portion of the electrode terminals 12 in a state where the battery wiring module 20 is connected to the single cell group 10, and therefore, short circuits due to contact between the electrode terminals 12 and a tool or the like are prevented.

In substantially the central portion of the front wall 61A in the longitudinal direction, the opening 613 that divides the front wall 61A into two portions is provided so as to be in communication with the first guiding-out groove 72. The portion of the front wall 61A, which is divided into two portions by the opening 613, on the right side in FIG. 6 is referred to as "right front wall 611", and the portion of the front wall 61A on the left side in FIG. 6 is referred to as "left front wall 612".

A first coming-off preventing projection 62 with a triangular shape as viewed from above projects from the inner wall surface of the back wall 61B at the end portion on the left side of the back wall 61B in FIG. 6. Two slits 62A and an elastic piece 62B that is formed between the two slits 62A and limits the upward movement of the external connecting bus bar 80 are formed in the side surface of this first coming-off preventing projection 62. When abutting against the end portion of the external connecting bus bar 80 inserted from above the first holding portion 60, this elastic piece 62B is elastically deformed toward the inside of the first coming-off preventing projection 62. When the external connecting bus bar 80 is placed on the bottom wall 61C, the elastic piece 62B elastically returns to the former state, limiting the vertical movement of the external connecting bus bar 80 and preventing the external connecting bus bar 80 from coming off.

A terminal locking portion 63 that projects from the inner wall surface of the back wall 61B, and that receives the second projecting piece in the voltage detecting terminal and is locked thereto is provided at the position adjacent to the first coming-off preventing projection 62 in the back wall 61B. Since the first coming-off preventing projection 62 and the terminal locking portion 63 project from the inner wall of the back wall 61B and the external connecting bus bar 80 is not exposed from the back wall 61B, short circuits due to contact of the external connecting bus bar 80 with a tool, surrounding metal members or the like can be prevented.

Two slits (not shown) extend upward from the lower end of the left front wall 612, and a first coming-off preventing piece 64 that prevents the external connecting bus bar 80 from coming off is formed therebetween. When abutting against the end portion of the external connecting bus bar 80 inserted from above the first holding portion 60, this first coming-off preventing piece 64 is elastically deformed toward the exterior of the front wall 61A. When the external connecting bus bar 80 is placed on the bottom wall 61C, the first coming-off preventing piece 64 elastically returns to the former state to limit the vertical movement of the external connecting bus bar 80 and prevents the external connecting bus bar 80 from coming off.

As shown in FIGS. 5 and 6, the two lids 66 and 69 are provided in the first holding portion 60 via hinges 65 extending from the upper end of the back wall 61B. The two lids 66 and 69 can rotate about the hinges 65 as an axial center, respectively.

When the left lid 66 on the left side in FIG. 6 is closed, the left half region of the first holding portion 60, the first guiding-out groove 72, and a portion of the first wire housing portion 76 are covered therewith.

As shown in FIGS. 5 and 6, a pair of left lid locking pieces 67 projects from the surface of the left lid 66, which is disposed on the lower side when the lid is closed. The left lid locking pieces 67 are locked to third locking grooves 73 (described below) that are provided on both sides of the first guiding-out groove 72 in the width direction.

A lid coupling engaged portion 68 that can receive and engage the lid coupling engaging piece 43 formed on the first lid 41 in the neighboring second holding unit 31B is provided at the position adjacent to the pair of left lid locking pieces 67. The lid coupling engaged portion 68 has the same configuration as the lid coupling engaged portion 44 formed on the first lid 41 in the second holding unit 31B, and includes an engaging piece inserting portion 68A that is open in the direction of coupling of the holding units 31 such that the lid coupling engaging piece 43 formed on the first lid 41 in the neighboring second holding unit 31B can be inserted thereinto and the coupling engaging hole 68B that is provided adjacently to the engaging piece inserting portion 68A and that can receive and engage the coupling engaging projection 43A in the lid coupling engaging piece 43.

A connecting terminal inserting hole 71 into which an external connecting terminal 82 with a bolt shape that is inserted into an external terminal connecting hole 81A in the external connecting bus bar 80 held by the first holding portion 60 can be inserted is formed at substantially the center of the right lid 69 provided on the right side in FIG. 6. As shown in FIGS. 5 and 6, right lid locking piece 70 projects from the surface of the right lid 69, which is disposed on the lower side when the lid is closed. The right lid locking piece 70 is locked to a fourth locking groove 74 (described below) provided adjacently to the third locking groove 73. Although the right half region of the first holding portion 60 is covered with the right lid 69 in a state where the right lid 69 is closed, the external connecting terminal 82 projects from the connecting terminal inserting hole 71.

First Guiding-Out Groove 72

The first guiding-out groove 72 is a groove-shaped member in which a barrel portion 26B of the voltage detecting terminal 25 guided out from the first holding portion 60 and the detecting wire W crimped to the barrel portion 26B are disposed and that causes the first holding portion 60 and the first wire housing portion 76 to be in communication with each other. The first guiding-out groove 72 has a recessed shape, and is provided in a direction substantially perpendicular to the direction in which the single cells 11 are lined up. Specifically, the first guiding-out groove 72 is provided so as to pass through the opening 613 of the front wall 61A in the first holding portion 60 to be in communication with the first holding portion 60 and to pass through an opening 77C of a back side groove wall 77A in the first wire housing portion 76 to be in communication with the first wire housing portion 76.

As shown in FIGS. 5 and 6, the pair of third locking grooves 73 that receives and is locked to the pair of left lid locking pieces 67 is formed on both sides of the first guiding-out groove 72, and the fourth locking groove 74 that receives and is locked to a right lid locking piece 70 is formed at the position adjacent to the third locking groove 73 on the right side.

As shown in FIGS. 5 and 6, a coupling engaging recess 75 that can engage the coupling engaging claw 48 in the neighboring second holding unit 31B is provided at the position adjacent to the third locking groove 73 formed on the left side of the first guiding-out groove 72. When a pair of elastic pieces 48A, on which the coupling engaging claws 48 are formed, in the neighboring second holding unit 31B is inserted into the coupling engaging recess 49 in the first holding unit 31A, the pair of elastic pieces 48A is inserted thereinto while being elastically deformed in a direction in which the pair of elastic pieces 48A comes closer to each other. When being inserted to a predetermined position, the pair of elastic pieces 48A elastically returns to the former state and is engaged with the coupling engaging recess 75.

First Wire Housing Portion 76

The first wire housing portion 76 is constituted of a pair of groove walls 77 (back side groove wall 77A and front side groove wall 77B) extending in the direction in which the single cells 11 are lined up and a bottom wall 78 connecting the pair of groove walls 77 so as to have a cross-section with a recessed shape. By coupling the first holding unit 31A and the neighboring second holding unit 31B, the wire housing portion 50 in the second holding unit 31B and the first wire housing portion 76 in the first holding unit 31A are coupled, and one groove (wire housing groove 51) that is continuous in the direction in which the single cells 11 are lined up is formed.

The detecting wire W that is guided out from the first guiding-out groove 72 is bent at substantially a right angle, is housed in the first wire housing portion 76, and is guided out to the side of the monitoring ECU together with the other detecting wires W.

The back side groove wall 77A on the side of the first guiding-out groove 72 is provided corresponding to the front wall 61A in the first holding portion 60. Even if the external connecting bus bar 80 and the voltage detecting terminal 25 are exposed from the slits formed on both sides of the first coming-off preventing piece 64 and a slit-shaped cut-out portion between the lower end of the first coming-off preventing piece 64 and the bottom wall 61C, they do not come in contact with conductive members or the like disposed around them.

External Connecting Bus Bar 80

As shown in FIG. 6, the external connecting bus bar 80 held by the first holding portion 60 in the first holding unit 31A is provided with the through hole 81A on the left side, into which the electrode post 13B in the electrode terminal 12 is inserted, and an external terminal connecting hole 81B on the right side, into which the bolt-shaped external connecting terminal 82 connected to an external device can be inserted. In the same manner as the through hole 23 in the bus bar 21, the through hole 81A in the external connecting bus bar 80 has an oval shape taking the direction in which the single cells 11 are lined up (horizontal direction in FIG. 1) as the longitudinal direction, and can absorb displacement of pitch between the neighboring electrode terminals 12A and 12B due to a manufacturing tolerance or an assembling tolerance of the single cell 11. The external connecting bus bar 80 is made of the same material as the bus bar 21 held by the holding portion 32 in the second holding unit 31B described above.

Voltage Detecting Terminal 25

The voltage detecting terminal 25 held by the first holding portion 60 in the first holding unit 31A has the same configuration as the voltage detecting terminal 25 held by the second holding unit 31B. In the first holding portion 60, the second projecting piece 28B is received by the terminal locking portion 63 in the back wall 61B in the first holding portion 60, and the voltage detecting terminal 25 is locked thereto.

Second Holding Portion 83 in First Holding Unit 31A

The bus bar 21 that connects between the electrode terminals 12 is housed in the second holding portion 83 (an example of a holding portion that holds the connecting member). The open end 34 in the neighboring second holding unit 31B is disposed on the left side of this second holding portion 83. However, a surrounding wall 84 (an example of a surrounding wall) that surrounds the peripheral edge of the bus bar 21 is provided in the second holding portion 83 in the first holding unit 31A, and therefore, that bus bar 21 is not in contact with the bus bar 21 held by the second holding unit 31B.

As shown in FIGS. 5 and 6, the second holding portion 83 is open upward and includes the surrounding wall 84 (84A, 84B, 84C, and 84D) that surrounds substantially all the peripheral edge of the bus bar 21 and a bottom wall 84E on which the bus bar 21 is placed.

As shown in FIG. 8, the bottom walls 84E are partially provided at the right and left end portions shown in the drawing and the central portion of the second holding portion 83 so as not to prevent the bus bar 21 and the electrode terminals 12 from electrically connecting to each other while a portion of the bus bar 21 is placed thereon.

Although not being specifically illustrated, the height of the surrounding wall 84 is set such that the surrounding wall 84 is higher than the upper end portion of the electrode terminals 12 in a state where the battery wiring module 20 is connected to the single cell group 10. Thereby, it is possible to suppress short circuits between the positive terminal 12A and the negative terminal 12B via a tool or the like due to contact of the tool or the like with the positive terminal 12A and the negative terminal 12B.

The surrounding wall 84 includes a back wall 84B disposed along the side edge on the back side in FIG. 6 of a pair of side edges of the bus bar 21 in the longitudinal direction, a front wall 84A disposed along the side edge on the front side in FIG. 6 of a pair of side edges of the bus bar 21 in the longitudinal direction, a right side wall 84D disposed along the side edge on the right side in FIG. 6 of a pair of side edges of the bus bar 21 in the short-length direction, and a left side wall 84C disposed along the side edge on the left side in FIG. 6 of a pair of side edges of the bus bar 21 in the short-length direction.

In substantially the central portion of the back wall 84B in a longitudinal direction, an opening 843 that divides the back wall 84B into two portions is provided so as to be in communication with the second guiding-out groove 92. The portion of the back wall 84B, which is divided into two portions by the opening 843, on the right side in FIG. 6 is referred to as "right back wall 841", and the portion of the back wall 84B on the left side in FIG. 6 is referred to as "left back wall 842".

Figure 10:
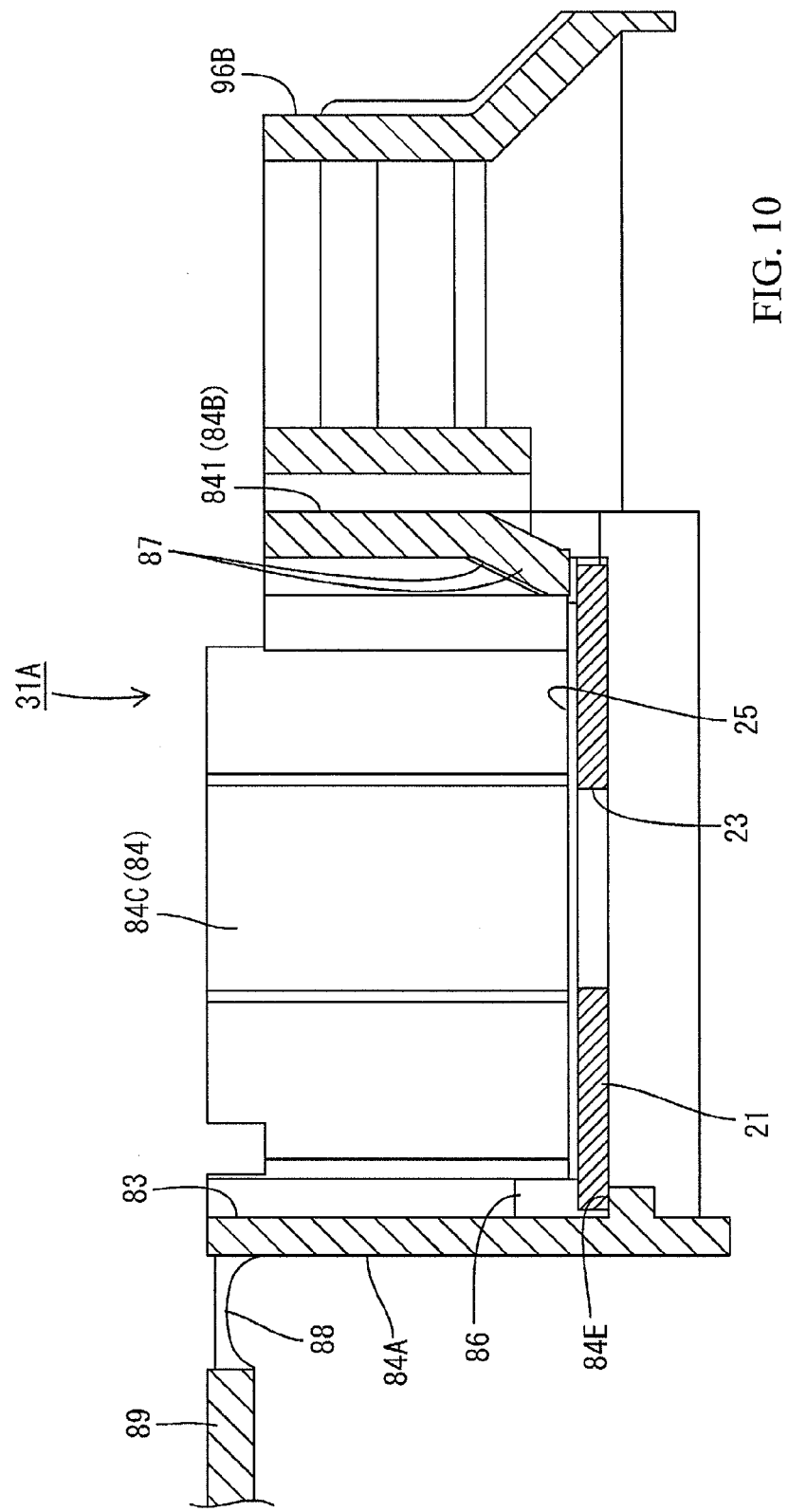
FIG. 10 is a cross-sectional view taken along A-A line shown in FIG. 6.
Figure 11:
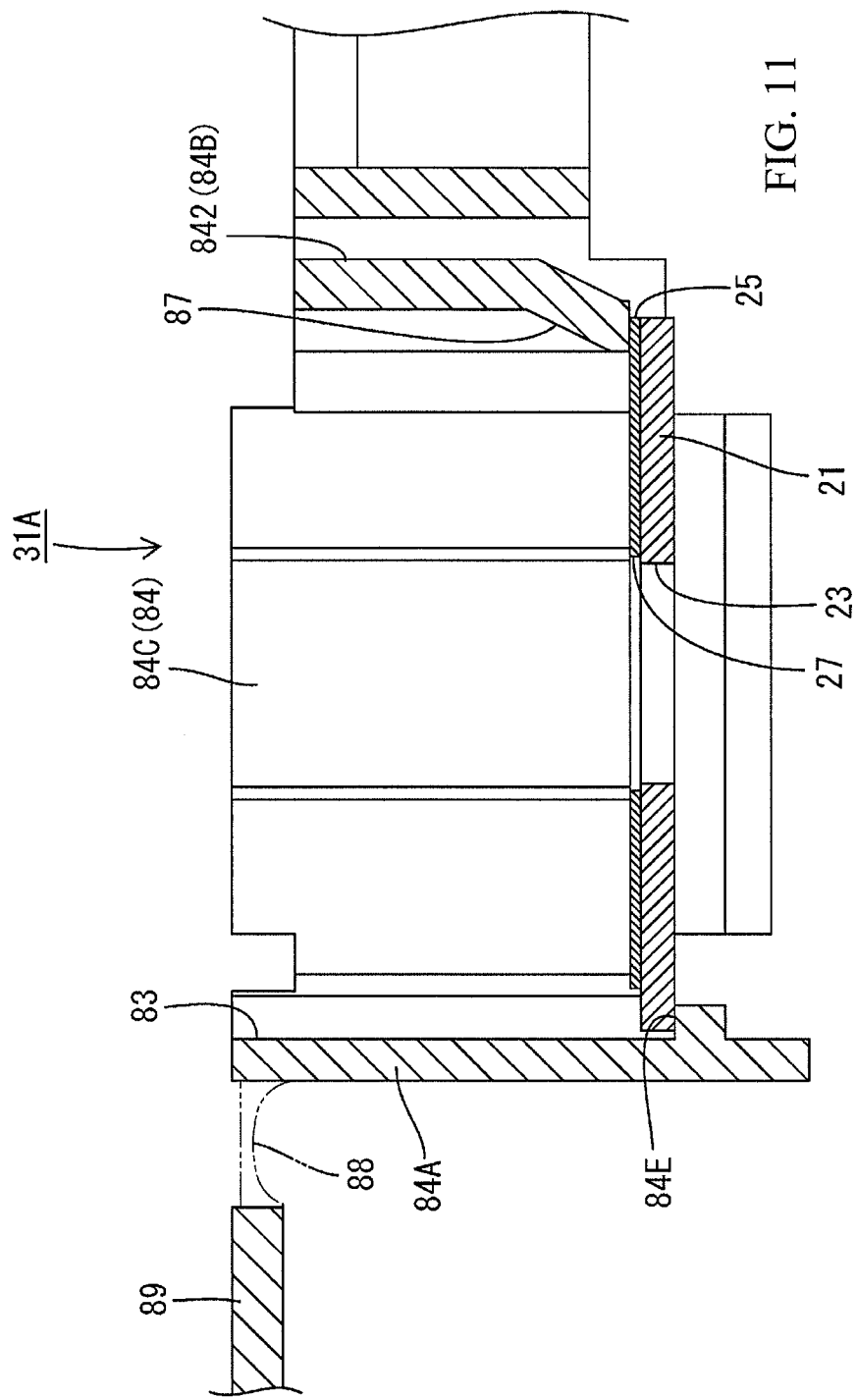
FIG. 11 is a cross-sectional view taken along B-B line shown in FIG. 6.

As shown in FIGS. 5, 10 and 11, two slits 87A extend upward from the lower end portion of the right back wall 841 and the left back wall 842, and second coming-off preventing pieces 87 (an example of a coming-off preventing portion) that prevent the bus bar 21 from coming off are formed between the two slits 87A. When abutting against the end portion of the bus bar 21 inserted from above the second holding portion 83, the second coming-off preventing pieces 87 are elastically deformed toward the exterior of the back wall 84B. When the bus bar 21 is placed on the bottom wall 84E, the second coming-off preventing pieces 87 elastically return to the former state to limit the vertical movement of the bus bar 21 and prevent the bus bar 21 from coming off.

A terminal locking portion 86 that projects from the inner wall surface of the front wall 84A, and that receives the second projecting piece 28B in the voltage detecting terminal 25 and is locked thereto is provided at the position on the left side from the center of the front wall 84A in FIG. 6. Since a second coming-off preventing projection 85 formed in the front wall 84A and the terminal locking portion 86 projects from the inner wall of the front wall 84A and the bus bar 21 is not exposed from the front wall 84A, short circuits due to contact of the bus bar 21 with a tool, surrounding metal members or the like can be prevented.

Figure 12:
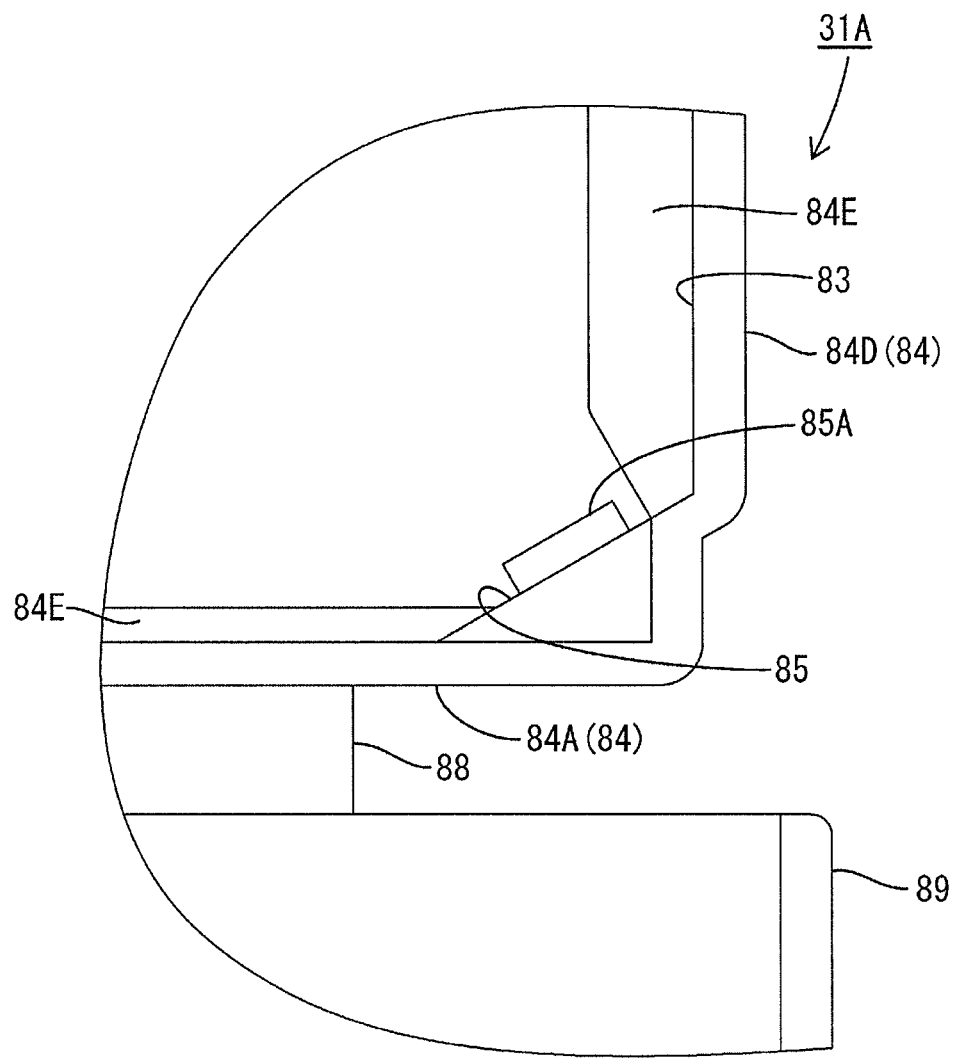
FIG. 12 is an enlarged plan view of the main part of the first holding unit before a connecting member is inserted thereinto.
Figure 13:
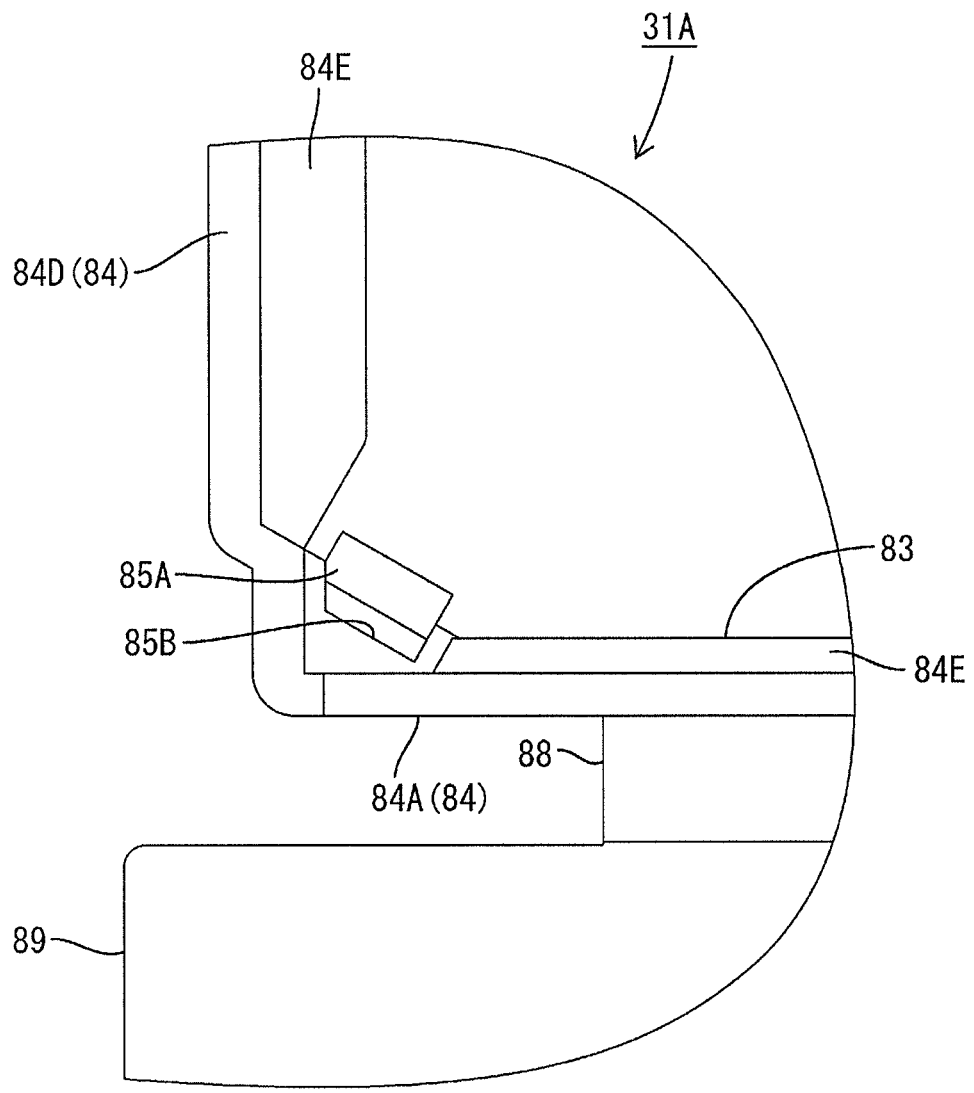
FIG. 13 is an enlarged rear view of the main part of the first holding unit before a connecting member is inserted thereinto.
Figure 14:
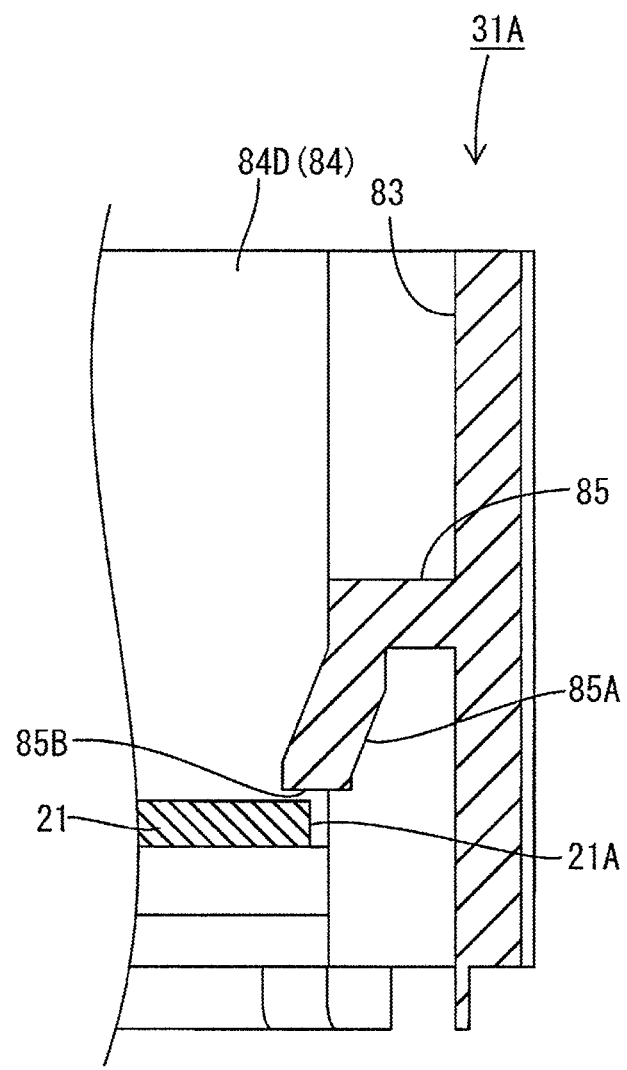
FIG. 14 is a cross-sectional view taken along C-C line shown in FIG. 6.

Incidentally, as shown in FIGS. 6, 8 and 12, the second coming-off preventing projection 85 (an example of a coming-off preventing projection) with a triangular shape as viewed from above projects toward the inside of the second holding portion 83 from the inner wall surface at the end portion on the right side of the front wall 84A in FIG. 6. The second coming-off preventing projection 85 is provided with an elastic piece 85b and a slit 85A formed along the edges other than the upper edge of the peripheral edges of the elastic piece 85B (see FIGS. 13 and 14). When abutting against the end portion of the bus bar 21 inserted from above the second holding portion 83, the elastic piece 85B is elastically deformed toward the inside of the second coming-off preventing projection 85. When the bus bar 21 is placed on the bottom wall 84E, the elastic piece 85B elastically returns to the former state to be disposed so as to cover the beveled corner 21A of the bus bar 21, limit the vertical movement of the bus bar 21 and to prevent the bus bar 21 from coming off (see FIGS. 14 and 15)

As shown in FIGS. 5 to 8, the third lid 89 is provided in the second holding portion 83 via a hinge 88 extending from the upper end of the front wall 84A. The third lid 89 can rotate about the hinge 88 as an axial center. When the third lid 89 is closed, the entire second holding portion 83, the second guiding-out groove 92, and the second wire housing portion 95 are covered therewith.

Figure 7:
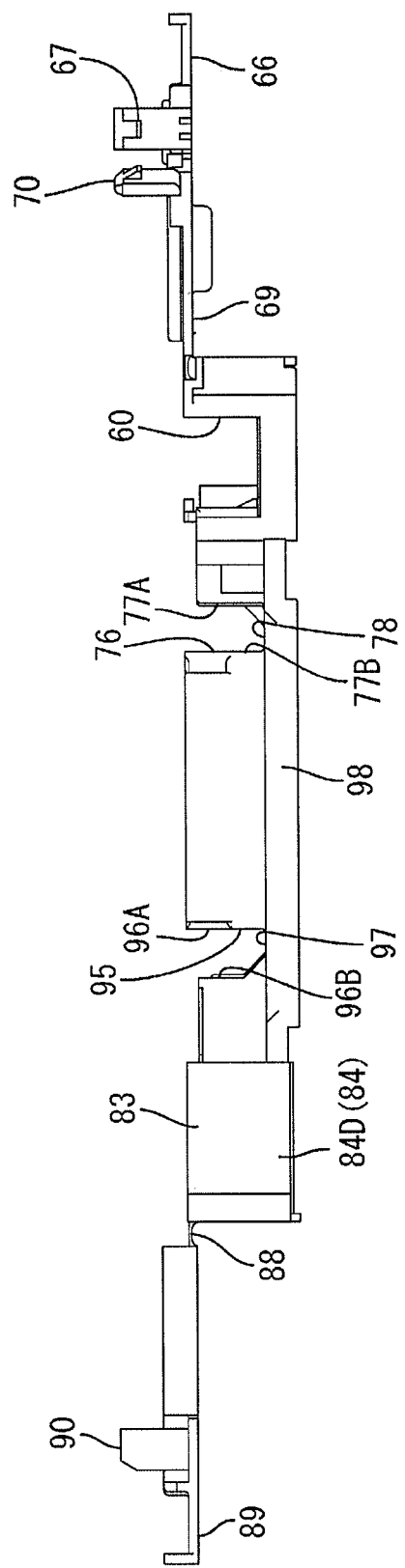
FIG. 7 is a side view of the first holding unit.

As shown in FIGS. 5 and 7, a pair of third lid locking pieces 90 projects from the surface of the third lid 89, which is disposed on the lower side when the lid is closed. The third lid locking pieces 90 are locked to fifth locking grooves 93

(described below) formed on both sides of the second guiding-out groove 92 in the width direction.

A lid coupling engaging piece 91 that is received by the lid coupling engaged portion 44 formed on the first lid 41 in the neighboring second holding unit 31B is provided at the position adjacent to the pair of third lid locking pieces 90. The lid coupling engaging piece 91 has the same configuration as the lid coupling engaging piece 43 formed on the first lid 41 in the second holding unit 31B31A, and a coupling engaging projection 91A that is engaged with the coupling engaging hole 44B in the lid coupling engaged portion 44 formed on the first lid 41 in the neighboring second holding unit 31B is formed at the end portion of the lid coupling engaging piece 91.

Therefore, the lid coupling engaging piece 91 in the third lid 89 is inserted into the engaging piece inserting portion 44A in the lid coupling engaged portion 44 in the neighboring second holding unit 31B and the coupling engaging projection 91A is engaged with the coupling engaging hole 44B, the third lid 89 and the first lid 41 in the second holding unit 31B can be coupled to each other.

Second Guiding-Out Groove 92

The second guiding-out groove 92 is a groove-shaped member in which a barrel portion 26B of the voltage detecting terminal 25 guided out from the second holding portion 83 and the detecting wire W crimped to the barrel portion 26B are disposed, and that causes the second holding portion 83 and the second wire housing portion 95 to be in communication with each other. The second guiding-out groove 92 has a recessed shape, and is provided in a direction substantially perpendicular to the direction in which the single cells 11 are lined up. Specifically, the second guiding-out groove 92 is provided so as to pass through the opening 843 of the back wall 84B in the second holding portion 83 to be in communication with the second holding portion 83 and to pass through an opening 96C of a front side groove wall 96B in the second wire housing portion 95 to be in communication with the second wire housing portion 95.

As shown in FIGS. 5 and 6, coupling engaging claws 94 that can engage the coupling engaging recess 49 in the neighboring second holding unit 31B are provided at the position adjacent to the fifth locking groove 93 formed on the left side of the second guiding-out groove 92. The coupling engaging claws 94 are formed at the end portions of a pair of elastic pieces 94A in the same manner as the coupling engaging claw 48 in the second holding unit 31B. When a pair of elastic pieces 94A is inserted into the coupling engaging recess 49 in the neighboring second holding unit 31B, the pair of elastic pieces 94A is inserted thereinto while being elastically deformed in a direction in which the pair of elastic pieces 94A comes closer to each other. When being inserted to a predetermined position in the coupling engaging recess 49, the pair of elastic pieces 94A elastically returns to the former state and is engaged with the coupling engaging recess 49.

Second Wire Housing Portion 95

The second wire housing portion 95 is constituted of a pair of groove walls 96 extending in the direction in which the single cells 11 are lined up and a bottom wall 97 connecting the pair of groove walls 96 so as to have a cross-section with a recessed shape. By coupling the first holding unit 31A to the neighboring second holding unit 31B, the wire housing portion 50 in the second holding unit 31B and the first wire housing portion 76 in the first holding unit 31A are coupled, and one groove (wire housing groove 51) that is continuous in the direction in which the single cells 11 are lined up is formed.

The detecting wire W that is guided out from the second guiding-out groove 92 is bent at substantially a right angle, is housed in the second wire housing portion 95, and is guided out to the side of the monitoring ECU together with the other detecting wires W.

The front side groove wall 96B on the side of the second guiding-out groove 92 is provided corresponding to the back wall 84B in the second holding portion 83. Even if the bus bar 21 and the voltage detecting terminal 25 are exposed from the slits 87A formed on both sides of the second coming-off preventing piece 87 and a slit-shaped cut-out portion between the lower end of the second coming-off preventing piece 87 and the bottom wall 84E, they do not come in contact with conductive members disposed around them (the front side groove wall 96B in the second wire housing portion 95 is an example of an insulating holding portion).

Bus Bar 21

As shown in FIGS. 1 and 6, the bus bar 21 held by the second holding portion 83 in the first holding unit 31A has the same shape and same size, and is made of the same material, as the bus bar 21 held by the second holding unit 31B.

Voltage Detecting Terminal 25

The voltage detecting terminal 25 held by the second holding portion 83 in the first holding unit 31A has the same configuration as the voltage detecting terminal 25 held by the second holding unit 31B, and the voltage detecting terminal 25 held by the first holding portion 60 in the first holding unit 31A. The second projecting piece 28B in the voltage detecting terminal 25 held by the second holding portion 83 is received by the terminal locking portion 86 in the front wall 84A in the second holding portion 83, and is locked thereto.

Method for Assembling Battery Wiring Module 20

Next, a method for assembling the battery wiring module 20 will be described.

First, the bus bar 21 is attached to the second holding unit 31B, and the bus bar 21 and the external connecting bus bar 80 are attached to the first holding unit 31A.

When being inserted into the holding portion 32 through the open end 34 in the holding portion 32 in the second holding unit 31B, the bus bar 21 is guided in the right direction in FIG. 2 by the guiding portion 36 formed on the back wall 33A in the holding portion 32. When the projecting portion 22A in the bus bar 21 abuts against the bus bar locking claw 39D formed on the front wall 33B, the bus bar locking claw 39D is bent and deformed toward the exterior of the wall 33.

When the bus bar 21 is further inserted to the front side (in the right direction in FIG. 2) and the recess 24 reaches the bus bar locking claw 39D, the bus bar locking claw 39D is received by the recess 24 in the bus bar 21 and elastically returns to the former state. Thereby, the end surface of the projecting portion 22A in the bus bar 21 abuts against the bus bar locking claw 39D, so that the movement of the bus bar 21 in the front-to-back direction in the direction of the insertion of the bus bar 21 is limited. In addition, the vertical movement of the bus bar 21 is limited by the coming-off preventing portions 35 provided on the wall 33, and the bus bar 21 is prevented from coming off.

When being inserted into the first holding portion 60 from above the first holding portion 60 in the first holding unit 31A, the external connecting bus bar 80 abuts against the elastic piece 62B formed in the first coming-off preventing projection 62 on the back wall 61B and the first coming-off preventing piece 64 formed on the left front wall 612, the elastic piece 62B is bent and deformed toward the inside of the first coming-off preventing projection 62, and the first coming-off preventing piece 64 is bent and deformed toward the exterior of the first holding portion 60. When the external connecting bus bar 80 is further inserted and is placed on the bottom wall 61C, the elastic piece 62B and the first coming-off preventing piece 64 elastically return to their former states, and the vertical movement of the external connecting bus bar 80 is limited by the first coming-off preventing projection 62 and the first coming-off preventing piece 64, so that the external connecting bus bar 80 is prevented from coming off.

When being inserted into the second holding portion 83 from above the second holding portion 83 in the first holding unit 31A, the bus bar 21 abuts against the elastic piece 85B formed in the second coming-off preventing projection 85 in the second holding portion 83, the second coming-off preventing piece 87 formed on the right back wall 841, and the second coming-off preventing piece 87 formed on the left back wall 842, the elastic piece 85B is bent and deformed toward the inside of the second coming-off preventing projection 85, and the second coming-off preventing pieces 87 are bent and deformed toward the exterior of the second holding portion 83. When the bus bar 21 is further inserted and is placed on the bottom wall 84E, the elastic piece 85B and the two second coming-off preventing pieces 87 elastically return to their former states, and the vertical movement of the bus bar 21 is limited by the elastic piece 85B and the two second coming-off preventing pieces 87, so that the bus bar 21 is prevented from coming off (see FIGS. 14 and 15).

Next, the neighboring holding units 31 are coupled to each other. When the pair of elastic pieces 48A and 94A on which the coupling engaging claws 48 and 94 are formed in the holding unit 31 are inserted into the coupling engaging recesses 49 and 75 in the neighboring holding units 31 in a state where the lids (first lid 41, second lid 55, third lid 89, right lid 69, and left lid 66) in the respective holding units 31 are open, the pair of elastic pieces 48A and 94A are inserted thereinto while being elastically deformed in a direction in which each pair of elastic pieces 48A and 94A comes closer to each other. When being inserted to predetermined positions in the coupling engaging recesses 49 and 75, the pair of elastic pieces 48A and 94A elastically return to the former state and are engaged with the coupling engaging recesses 49 and 75. Thereby, the holding portions 32, 60 and 83 are connected to each other, and the wire housing portions 50, 76 and 95 are coupled to each other.

At the end portion, the holding portion 32 in one second holding unit 31B is coupled to the first holding portion 60 in the first holding unit 31A, and the holding portion 32 in another second holding unit 31B is coupled to the second holding portion 83 in the first holding unit 31A. Moreover, at the end portion, the wire housing portion 50 in one second holding unit 31B is coupled to the first wire housing portion 76 in the first holding unit 31A, and the wire housing portion 50 in another second holding unit 31B is coupled to the second wire housing portion 95 in the first holding unit 31A.

Furthermore, after the lid coupling engaging pieces 43 and 91 are inserted into the engaging piece inserting portions 44A and 68A in the lid coupling engaged portions 44 and 68 in the neighboring holding units 31, the coupling engaging projections 43A and 91A are engaged with the coupling engaging holes 44B and 68B. Then, the neighboring first lids 41 are coupled to each other, the first lid is coupled to the neighboring third lid 89, and the first lid is coupled to the neighboring left lid 66.

Since the insulating wall 33C of the holding unit 31 is disposed between the bus bars 21, which are disposed at the neighboring positions, by coupling a plurality of the second holding units 31B that hold the bus bar 21, even if the open end 34 is provided in the holding portion 32, the bus bars 21 do not come in contact with each other.

Also, since the insulating wall 33C of the second holding unit 31B is disposed between the bus bar 21 and the external connecting bus bar 80 neighboring to each other on the back side shown in FIG. 1 by coupling the second holding unit 31B and the first holding unit 31A, the bus bar 21 and the external connecting bus bar 80 do not come in contact with each other.

In addition, since the left side wall 84C of the first holding unit 31A is disposed between the bus bars 21 neighboring to each other on the front side shown in FIG. 1 by coupling the second holding unit 31B and the first holding unit 31A, the bus bars 21 do not come in contact with each other.

Next, the voltage detecting terminal 25 is attached by fitting the voltage detecting terminal 25 to the upper side of the bus bar 21 housed in the holding portion 32 and guiding out the detecting wire W crimped to the voltage detecting terminal 25 from the guiding-out groove 45 to the wire housing portion 50 (wire housing groove 51).

In the same manner, the voltage detecting terminals 25 are attached by fitting the voltage detecting terminals 25 to the upper side of the external connecting bus bar 80 housed in the first holding portion 60 and to the upper side of the bus bar 21 housed in the second holding portion 83, and by guiding out the detecting wires W crimped to the voltage detecting terminals 25 from the respective guiding-out grooves (first guiding-out groove 72 and the second guiding-out groove 92) to the first wire housing portion 76 and the second wire housing portion 95 (wire housing groove 51).

When the voltage detecting terminal 25 is attached to the holding portion 32, first, the second projecting piece 28B in the voltage detecting terminal 25 is inserted below the terminal locking piece 37. Thereby, the movement of the second projecting piece 28B in the voltage detecting terminal 25 in the upward direction and the front-to-back direction in the direction of the insertion of the bus bar 21 is limited by the locking projection 38 in the terminal locking piece 37, and the second projecting piece 28B in the voltage detecting terminal 25 is positioned.

The edge on the side of the barrel portion 25B in the voltage detecting terminal 25 is further pushed to the holding portion 32 from above. Then, the voltage detecting terminal 25 abuts against the terminal locking claw 39C in the elastic engaging piece 39A, and the terminal locking claw 39C is bent and deformed toward the exterior of the wall 33. When the voltage detecting terminal 25 is further pushed downward and is disposed below the lower end portion of the terminal locking claw 39C, the terminal locking claw 39C elastically returns to the former state and projects above the voltage detecting terminal 25, so that the vertical movement of the voltage detecting terminal 25 is limited.

When the voltage detecting terminal 25 is attached to the first holding portion 60, first, the second projecting piece 28B in the voltage detecting terminal 25 is inserted into the terminal locking portion 63. Thereby, the movement of the second projecting piece 28B in the voltage detecting terminal 25 in the upward direction and the front-to-back direction in the direction of the insertion of the bus bar 21 is limited by the terminal locking portion 63, and the second projecting piece 28B in the voltage detecting terminal 25 is positioned. The edge on the side of the barrel portion 25B in the voltage detecting terminal 25 is further pushed to the first holding portion 60 from above. Then, the voltage detecting terminal 25 abuts against the first coming-off preventing piece 64, and the first coming-off preventing piece 64 is bent and deformed toward the exterior of the first holding portion 60. When the voltage detecting terminal 25 is further pushed downward and is disposed below the lower end portion of the first coming-off preventing piece 64, the first coming-off preventing piece 64 elastically returns to the former state and projects above the voltage detecting terminal 25, so that the vertical movement of the voltage detecting terminal 25 is limited.

When the voltage detecting terminal 25 is attached to the second holding portion 83, first, the second projecting piece 28B in the voltage detecting terminal 25 is inserted into the terminal locking portion 86. Thereby, the movement of the second projecting piece 28B in the voltage detecting terminal 25 in the upward direction and the front-to-back direction in the direction of the insertion of the bus bar 21 is limited by the terminal locking portion 86, and the second projecting piece 28B in the voltage detecting terminal 25 is positioned. The edge on the side of the barrel portion 25B in the voltage detecting terminal 25 is further pushed to the second holding portion 83 from above. Then, the voltage detecting terminal 25 abuts against the second coming-off preventing piece 87 on the left back wall 842, and the second coming-off preventing piece 87 is bent and deformed toward the exterior of the second holding portion 83. When the voltage detecting terminal 25 is further pushed downward and is disposed below the lower end portion of the second coming-off preventing piece 87, the second coming-off preventing piece 87 elastically returns to the former state and projects above the voltage detecting terminal 25, so that the vertical movement of the voltage detecting terminal 25 is limited. When all the voltage detecting terminal 25 are attached thereto, the battery wiring module 20 is completed.

Next, the battery wiring module 20 is assembled to the single cell group 10. The single cell group 10 has been made by arranging the single cells 11 such that the polarities of the neighboring electrode terminals 12 in the neighboring single cells 11 are different, and the battery wiring module 20 is assembled to the single cell group 10. Specifically, the electrode terminals 12 (electrode posts 13B) in the single cells 11 are inserted into the through holes 23 in the bus bars 21, the through holes 81A in the external connecting bus bar 80, and the inserting holes 27 in the voltage detecting terminal 25 superposed on these through holes 23 and 81A. The external connecting terminal 82 is inserted into the external terminal connecting hole 80B in the external connecting bus bar 80.

At that time, since, in the second holding unit 31B, the bus bar 21 is inserted in the direction in which the single cells 11 are lined up and is held in a state where the vertical movement of the holding portion 32 is limited by the coming-off preventing portion 35, even if the battery wiring module 20 collides to the electrode post 13B or the upper surface 11A (terminal forming surface) of the single cell 11, the bus bar 21 is not likely to be pushed up, and therefore, the work proceeds smoothly.

The bus bar 21 is disposed so as to come into contact with the platform of the electrode terminals 12 by inserting the electrode posts 13B into the through holes 23 or the through holes 23 and the inserting holes 27, and is fixed thereto by screwing screw members (not shown) on the electrode posts 13B. At that time, the walls 33 in the holding units 31 are formed so as to be higher than the electrode posts 13B, and therefore, even if the tool used to screw the screw members on the electrode posts 13B is dropped and comes into contact therewith, no short circuit occurs.

After the screw members are fixed to the electrode posts 13B by repeating the above-described work, the single cell group 10 is ready to be electrically connected. Next, the second lid 55 and the first lid 41 in the battery wiring module 20 are closed in this order and the third lid 89, the left lid 66 and the right lid 69 are closed, and then, the battery module M is completed.

Functionality and Effects of this Embodiment

Hereinafter, functionality and effects of this embodiment will be described.

Figure 15:
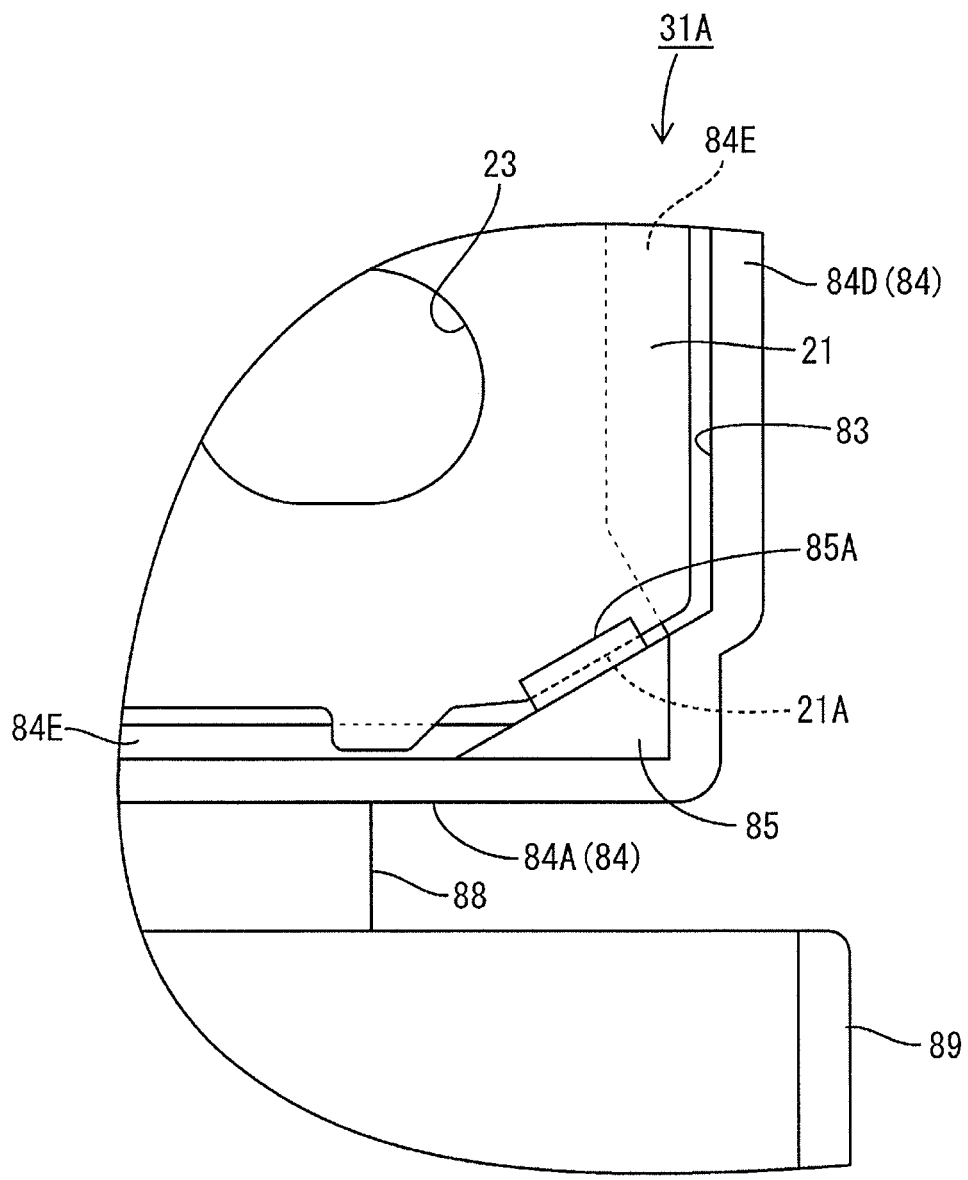
FIG. 15 is an enlarged plan view of the main part of the first holding unit.

In this embodiment, the second coming-off preventing projection 85 provided with the elastic piece 85B that is disposed so as to cover the beveled corner 21A of the bus bar 21 is formed on the inner wall of the surrounding wall 84 in the holding portion 83 (second holding portion 83 in the first holding unit 31A) in the resin protector 30 (see FIG. 15). That is, in this embodiment, the elastic piece 85B is provided on the second coming-off preventing projection 85 projecting from the inner wall of the surrounding wall 84, and therefore, a structure for preventing the bus bar 21 from coming off can be provided without forming a cut-out portion such as a slit in the outer wall of the surrounding wall 84. As a result, with this embodiment, the bus bar 21 is not exposed from the second holding portion 83 in the first holding unit 31A, and therefore, it is possible to provide the battery module 20 in which short circuits due to contact between the bus bar 21 and members that are disposed around the single cell 11 are prevented.

Moreover, in this embodiment, since the second coming-off preventing projection 85 is formed corresponding to the beveled corner 21A of the bus bar 21, the corner 21A of the bus bar may be formed in a beveled shape and the portion corresponding to the beveled corner 21A of the bus bar 21 in the inner wall of the second holding portion 83 may have a projecting shape. Therefore, with this embodiment, no special machining is needed on the bus bar 21 and space can be saved.

Furthermore, in this embodiment, while the second coming-off preventing piece 87 (coming-off preventing portion) disposed so as to cover the portion other than the beveled corner 21A of the bus bar is provided on the surrounding wall 84 in the second holding portion 83, the front side groove wall 96B serving as an insulating holding portion that maintains an insulating state of the bus bar 21 is formed outside the surrounding wall 84 of the second holding portion 83, corresponding to the second coming-off preventing piece 87.

Accordingly, with this embodiment, even if a slit or the like is formed in the surrounding wall 84 in order to provide the second coming-off preventing piece 87 for preventing the bus bar 21 from coming off in the second holding portion 83, the insulating state of the bus bar 21 is maintained, and therefore, short circuits due to contact between the bus bar 21 and members that are disposed around the single cell 11 are prevented while preventing the bus bar 21 from coming off. In addition, with this embodiment, since a plurality of structures for preventing the bus bar 21 from coming off are provided in the second holding portion 83, the bus bar 21 can be reliably prevented from coming off.

Moreover, in this embodiment, the voltage detecting terminal 25 can be housed in the second holding portion 83 together with the bus bar 21, and the terminal locking portion 86 that prevents the bus bar 21 from coming off by locking the voltage detecting terminal 25 projects from the inner wall of the surrounding wall 84. As a result, with this embodiment, by locking the voltage detecting terminal 25 to the terminal locking portion 86 formed on the surrounding wall 84, the bus bar 21 is prevented from coming off the second holding portion 83, and therefore, it is possible to cause one member to have two functions. Furthermore, since the terminal locking portion 86 projects from the inner wall of the surrounding wall 84, the bus bar 21 and the voltage detecting terminal 25 are not exposed from the surrounding wall 84, and therefore, short circuits due to contact between the bus bar 21 and members that are disposed around the single cell 11 are also prevented.

Other Embodiments

The present invention is not limited to the embodiment explained by the above description and the drawings. For example, embodiments explained below are also included in the technical scope of the present invention.

(1) Although the resin protector 30 obtained by coupling the plurality of holding units 31 is shown in the above-described embodiment, the resin protector 30 may be an integrated resin protector including a plurality of holding portions.

(2) Although, in the above-described embodiment, the example is shown in which the coming-off preventing projection 85 is provided on the surrounding wall 84 in the second holding portion 83 in the first holding unit 31A that is disposed at the end portion, a surrounding wall may be provided in a holding portion in a holding unit that is disposed in a portion other than the end portion and a coming-off preventing projection projecting toward the side of the inner wall may be formed thereon.

(3) Although the bus bar 21 connected to the second holding portion 83 in the first holding unit 31A and the bus bar 21 connected to the holding portion in the second holding unit 31B have the same shape in the above-described embodiment, the two bus bars may have different shapes from each other.

(4) Although, in the above-described embodiment, the example is shown in which the front side groove wall 96B of the second wire housing portion 95 serves as an insulating holding portion formed corresponding to the second coming-off preventing piece 87 on the surrounding wall 84 in the first holding unit 31A, an insulating plate different from the wire housing port may be disposed corresponding to the second coming-off preventing piece.

(5) Although the terminal locking portion 86 projecting toward the side of the inner wall of the surrounding wall 84 is shown in the above-described embodiment, a terminal locking portion may be formed by hollowing out a portion of the surrounding wall to the extent that an opening is not formed. Moreover, a first holding unit may include a holding portion with no terminal locking portion.

(6) Although the resin protector 30 including the two types of holding units 31A and 31B in which the directions of the insertion of the bus bar 21 are different from each other are shown in the above-described embodiment, all the holding portion may be a holding portion into which the bus bar 21 can be inserted from the direction of the assembly of a holding unit.

(7) Although the above-described embodiment includes the holding portion (second holding portion) provided with the coming-off preventing projection 85 on the only one beveled corner of the bus bar 21, coming-off preventing projections corresponding to all the beveled corners of the bus bar 21 may be provided.

LIST OF REFERENCE NUMERALS

M Battery module
10 Single cell group
11 Single cell
11A Upper surface
12 Electrode terminal
12A Positive terminal
12B Negative terminal
20 Battery wiring module
21 Bus bar (connecting member)
21A Beveled corner
25 Voltage detecting terminal
28B Second projecting piece
W Detecting wire
30 Resin protector
31A First holding unit
31B Second holding unit
32 Holding portion
35 Coming-off preventing portion
37 Terminal locking piece
38 Locking projection
39A Elastic engaging piece
60 First holding portion
80 External connecting bus bar
83 Second holding portion
84 Surrounding wall
84A Front wall
84B Back wall
841 Right back wall
842 Left back wall
84C Left side wall
84D Right side wall
85 Second coming-off preventing projection (coming-off preventing projection)
85A Slit
85B Elastic piece
86 Terminal locking portion
87 Second coming-off preventing piece (coming-off preventing portion)
87A Slit
95 Second wire housing portion
96 Groove wall
96A Back side groove wall
96B Front side groove wall (insulating holding portion)

The invention claimed is:

1. A battery wiring module comprising:
a connecting member connected to an electrode terminal and comprising a beveled corner; and
a resin protector made of insulating resin that comprises:
a holding portion for holding the connecting member, wherein the holding portion is provided with a surrounding wall that surrounds a peripheral edge of the connecting member, and
a coming-off preventing projection, wherein the coming-off preventing projection comprises an elastic piece that is disposed so as to cover the beveled corner of the connecting member and thereby limit movement of the connecting member.

2. The battery wiring module according to claim 1, wherein a second coming-off preventing projection is provided on the surrounding wall of the holding portion and is disposed so as to cover a portion other than the beveled corner of the connecting member, and
wherein an insulating holding portion that maintains an insulating state of the connecting member is formed outside the surrounding wall of the holding portion, corresponding to the coming-off preventing portion.

3. The battery wiring module according to claim 1, wherein a voltage detecting terminal is housed in the holding portion together with the connecting member, and
wherein a terminal locking portion provided at an inner wall of the surrounding wall so as to project or be recessed therefrom limits movement of the connecting member by locking the voltage detecting terminal.

4. The battery wiring module according to claim 2, wherein a voltage detecting terminal is housed in the holding portion together with the connecting member, and wherein a terminal locking portion provided at an inner wall of the surrounding wall so as to project or be recessed therefrom limits movement of the connecting member by locking the voltage detecting terminal.

5. The battery wiring module according to claim 1, wherein the battery wiring module is attached to a single cell group obtained by lining up a plurality of single cells having a positive electrode terminal and a negative electrode terminal.

6. The battery wiring module according to claim 1, wherein a height of the surrounding wall is higher than an upper edge portion of the electrode terminal.

7. The battery wiring module according to claim 1, wherein no portion of the connecting member is exposed to an exterior surface of a back wall of the surrounding wall of the holding portion.

8. The battery wiring module according to claim 1, wherein the coming-off preventing projection defines two slits, and wherein the elastic piece is disposed between the two slits.

9. The battery wiring module according to claim 8, wherein when the elastic piece abuts the connecting member, the elastic piece elastically deforms toward an inside space of the coming-off preventing projection, and
wherein when the elastic piece does not abut the connecting member, the elastic piece returns to a state prior to the elastic deformation.

10. The battery wiring module according to claim 1, wherein the movement of the connecting member is a vertical movement of the connecting member.

11. The battery wiring module according to claim 1, wherein the resin protector further comprises a plurality of holding portions coupled together.

12. The battery wiring module according to claim 1, wherein the resin protector comprises a plurality of integrated holding portions.

13. The battery wiring module according to claim 1, further comprising at least two connecting members that have the same shape.

14. The battery wiring module according to claim 1, further comprising at least two connecting members that have a different shape.

15. The battery wiring module according to claim 1, wherein a terminal locking portion is formed on an inner surface of the surrounding wall by hollowing out a portion of the surrounding wall to the extent an opening is not formed in the surrounding wall.

16. The battery wiring module according to claim 1, wherein the connecting member further comprises a plurality of beveled corners, and
wherein the resin protector further comprises a plurality of coming-off preventing projections corresponding to the plurality of beveled corners so that each respective coming-off preventing projection corresponds to each respective beveled corner.

17. A method for assembling a battery wiring module comprising:
inserting a connecting member into an opening of a holding portion so that a portion of the connecting member abuts an elastic piece provided on an inner wall of the holding portion and the elastic piece elastically deforms towards an exterior wall of the holding portion, and
after the inserting the connecting member into the opening of the holding portion, further inserting the connecting member into the opening of the holding portion so that the elastic piece elastically returns to a former state and thereby limits movement of the connecting member by extending over and covering a portion of the connecting member.

18. The method for assembling a battery wiring module according to claim 17, wherein the connecting member is inserted into the opening of the holding portion in a vertical direction.

19. The method for assembling a battery wiring module according to claim 17, wherein the connecting member is inserted into the opening of the holding portion in a horizontal direction.

20. The method for assembling a battery wiring module according to claim 17, wherein the connecting member is inserted into the opening of the holding portion in a direction of assembly of the holding portion.

* * * * *